(12) United States Patent
Kim et al.

(10) Patent No.: US 9,877,265 B2
(45) Date of Patent: Jan. 23, 2018

(54) CODING APPROACH FOR A ROBUST AND FLEXIBLE COMMUNICATION PROTOCOL

(71) Applicants: Minji Kim, Cambridge, MA (US); Muriel Medard, Belmont, MA (US); Ali Parandehgheibi, Medford, MA (US)

(72) Inventors: Minji Kim, Cambridge, MA (US); Muriel Medard, Belmont, MA (US); Ali Parandehgheibi, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 291 days.

(21) Appl. No.: 14/297,090

(22) Filed: Jun. 5, 2014

(65) Prior Publication Data
US 2016/0302134 A1 Oct. 13, 2016

Related U.S. Application Data

(63) Continuation of application No. 13/291,310, filed on Nov. 8, 2011, now Pat. No. 8,780,693.

(51) Int. Cl.
*H04W 40/24* (2009.01)
*G06F 15/16* (2006.01)
(Continued)

(52) U.S. Cl.
CPC ............ *H04W 40/24* (2013.01); *G06F 15/16* (2013.01); *H04L 45/16* (2013.01);
(Continued)

(58) Field of Classification Search
CPC ...... G06F 15/16; H04L 43/0811; H04L 45/00; H04L 45/16; H04L 45/22; H04L 45/28;
(Continued)

(56) References Cited

U.S. PATENT DOCUMENTS

| 5,577,056 A | 11/1996 | Malik et al. |
| 6,128,773 A | 10/2000 | Snider |

(Continued)

FOREIGN PATENT DOCUMENTS

| EP | 1 638 239 A1 | 3/2006 |
| WO | WO 2007/109216 A1 | 9/2007 |

(Continued)

OTHER PUBLICATIONS

Office Action dated Jun. 9, 2015 for U.S. Appl. No. 13/968,566, filed Aug. 16, 2013.

(Continued)

*Primary Examiner* — Walter DiVito
*Assistant Examiner* — Dharmesh Patel
(74) *Attorney, Agent, or Firm* — Daly, Crowley, Mofford & Durkee, LLP

(57) ABSTRACT

A coding approach for a robust and flexible network communication protocol is described. By using coding, it is possible to eliminate the need to track packet identities, and hence, it is possible to reduce coordination overhead associated with many conventional protocols. The method and system described herein takes advantage of multiple paths, interfaces, mediums, servers, and storage locations available in a network. The proposed protocol allows quick response to congestion by load balancing over different network resources. The method also enables soft vertical hand-overs across heterogeneous networks. In one embodiment, a media file is divided into chunks and transmitted using a transport protocol tailored to meet delay requirements of media streaming applications. Also described are different coding strategies for chunk delivery based upon an urgency level of each chunk.

25 Claims, 6 Drawing Sheets

(51) Int. Cl.

| | | |
|---|---|---|
| *H04W 40/00* | (2009.01) | |
| *H04W 4/00* | (2009.01) | |
| *H04W 28/02* | (2009.01) | |
| *H04W 28/08* | (2009.01) | |
| *H04L 12/761* | (2013.01) | |
| *H04L 29/08* | (2006.01) | |
| *H04L 29/06* | (2006.01) | |
| *H04W 48/02* | (2009.01) | |
| *H04W 28/06* | (2009.01) | |
| *H04W 84/12* | (2009.01) | |
| *H04W 88/08* | (2009.01) | |

(52) U.S. Cl.
CPC .......... *H04L 67/1002* (2013.01); *H04L 69/14* (2013.01); *H04W 4/00* (2013.01); *H04W 28/02* (2013.01); *H04W 28/08* (2013.01); *H04W 40/00* (2013.01); *H04W 48/02* (2013.01); *H04W 28/065* (2013.01); *H04W 84/12* (2013.01); *H04W 88/08* (2013.01)

(58) Field of Classification Search
CPC ..... H04L 67/14; H04L 67/1002; H04L 69/28; H04L 69/40; H04W 4/00; H04W 28/02; H04W 28/08; H04W 28/065; H04W 40/00

See application file for complete search history.

(56) References Cited

U.S. PATENT DOCUMENTS

| | | |
|---|---|---|
| 6,621,851 B1 | 9/2003 | Agee et al. |
| 6,885,653 B2 | 4/2005 | Choi et al. |
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |
| 7,349,440 B1 | 3/2008 | Chou et al. |
| 7,408,938 B1 | 8/2008 | Chou et al. |
| 7,414,978 B2 | 8/2008 | Lun et al. |
| 7,529,198 B2 | 5/2009 | Jain et al. |
| 7,706,365 B2 | 4/2010 | Effros et al. |
| 7,760,728 B2 | 7/2010 | Chou et al. |
| 7,821,980 B2 | 10/2010 | Chakrabarti et al. |
| 7,876,677 B2 | 1/2011 | Cheshire |
| 7,912,003 B2 | 3/2011 | Radunovic et al. |
| 7,945,842 B2 | 5/2011 | He et al. |
| 8,040,836 B2 | 10/2011 | Wu et al. |
| 8,068,426 B2 | 11/2011 | Sundararajan et al. |
| 8,130,776 B1 | 3/2012 | Sundararajan et al. |
| 8,279,781 B2 | 10/2012 | Lucani et al. |
| 8,451,756 B2 | 5/2013 | Lucani et al. |
| 8,482,441 B2 | 7/2013 | Medard et al. |
| 8,504,504 B2 | 8/2013 | Liu |
| 8,571,214 B2 | 10/2013 | Lima et al. |
| 9,019,643 B2 | 4/2015 | Medard et al. |
| 9,185,529 B2 | 11/2015 | Medard et al. |
| 2003/0055614 A1 | 3/2003 | Pelikan |
| 2003/0214951 A1 | 11/2003 | Joshi et al. |
| 2004/0203752 A1 | 10/2004 | Wojaczynski et al. |
| 2005/0010675 A1 | 1/2005 | Jaggi et al. |
| 2005/0078653 A1 | 4/2005 | Agashe et al. |
| 2005/0152391 A1 | 7/2005 | Effros et al. |
| 2005/0251721 A1 | 11/2005 | Ramesh et al. |
| 2006/0020560 A1 | 1/2006 | Rodriguez et al. |
| 2006/0146791 A1 | 7/2006 | Deb et al. |
| 2006/0224760 A1 | 10/2006 | Yu et al. |
| 2007/0046686 A1 | 3/2007 | Keller |
| 2007/0116027 A1 | 5/2007 | Ciavaglia et al. |
| 2007/0160017 A1* | 7/2007 | Meier ................... H04W 36/18 370/338 |
| 2007/0274324 A1 | 11/2007 | Wu et al. |
| 2008/0043676 A1 | 2/2008 | Mousseau et al. |
| 2008/0049746 A1 | 2/2008 | Morrill et al. |
| 2008/0123579 A1 | 5/2008 | Kozat et al. |
| 2008/0259796 A1 | 10/2008 | Abousleman et al. |
| 2008/0291834 A1 | 11/2008 | Chou et al. |
| 2008/0320363 A1 | 12/2008 | He |
| 2009/0003216 A1 | 1/2009 | Radunovic et al. |
| 2009/0135717 A1 | 5/2009 | Kamal et al. |
| 2009/0153576 A1 | 6/2009 | Keller |
| 2009/0175320 A1 | 7/2009 | Haustein et al. |
| 2009/0198829 A1 | 8/2009 | Sengupta et al. |
| 2009/0207930 A1 | 8/2009 | Sirkeci et al. |
| 2009/0238097 A1 | 9/2009 | Le Bars et al. |
| 2009/0248898 A1 | 10/2009 | Gkantsidis et al. |
| 2009/0285148 A1* | 11/2009 | Luo .................... H04B 7/15521 370/315 |
| 2009/0310582 A1 | 12/2009 | Beser |
| 2009/0313459 A1 | 12/2009 | Horvath |
| 2009/0316763 A1 | 12/2009 | Erkip et al. |
| 2010/0014669 A1 | 1/2010 | Jiang |
| 2010/0046371 A1 | 2/2010 | Sundararajan et al. |
| 2010/0057636 A1 | 3/2010 | Brennan |
| 2010/0111165 A1 | 5/2010 | Kim et al. |
| 2010/0146357 A1* | 6/2010 | Larsson ................ H04L 1/1845 714/750 |
| 2011/0164562 A1* | 7/2011 | Qiu .................... H04W 72/1236 370/328 |
| 2011/0238855 A1 | 9/2011 | Korsunsky et al. |
| 2011/0307546 A1* | 12/2011 | Iovene ................... H04L 45/00 709/203 |
| 2012/0051321 A1* | 3/2012 | De .................... H04W 36/0011 370/331 |
| 2012/0057636 A1 | 3/2012 | Tian et al. |
| 2012/0218891 A1 | 8/2012 | Sundararajan et al. |
| 2012/0300692 A1 | 11/2012 | Sfar et al. |
| 2013/0107764 A1 | 5/2013 | Zeger et al. |
| 2013/0114481 A1 | 5/2013 | Kim et al. |
| 2013/0114611 A1 | 5/2013 | Zeger et al. |
| 2013/0195106 A1 | 8/2013 | Calmon et al. |
| 2014/0064296 A1 | 3/2014 | Haeupler et al. |
| 2014/0185803 A1 | 7/2014 | Lima et al. |
| 2014/0269485 A1 | 9/2014 | Medard et al. |
| 2014/0269503 A1 | 9/2014 | Medard et al. |
| 2014/0269505 A1 | 9/2014 | Medard et al. |
| 2014/0280395 A1 | 9/2014 | Medard et al. |
| 2014/0280454 A1 | 9/2014 | Medard et al. |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |

OTHER PUBLICATIONS

Office Action dated Jul. 9, 2015 for U.S. Appl. No. 14/013,324.
Office Action dated Jul. 10, 2015 for U.S. Appl. No. 14/013,330.
Response to Office Action dated Jul. 9, 2015 for U.S. Appl. No. 13/968,566.
Response dated Oct. 6, 2015 to Office Action dated Jul. 10, 2015; for U.S. Appl. No. 14/013,330; 10 pages.
Notice of Allowance dated Oct. 19, 2015 for U.S. Appl. No. 14/013,324; 9 pages.
U.S. Appl. No. 14/822,115, filed Aug. 10, 2015, Lima et al.
U.S. Appl. No. 14/843,358, filed Sep. 2, 2015, Haeupler et al.
U.S. Appl. No. 14/826,256, filed Aug. 14, 0215, Zeger et al.
Notice of Allowance dated Nov. 5, 2015 corresponding to U.S. Appl. No. 14/013,330; 9 pages.
U.S. Appl. No. 14/678,359, filed Aug. 3, 2015, Zeger, et al.
U.S. Appl. No. 13/654,953, filed Oct. 18, 2012, Zeger, et al.

(56) References Cited

OTHER PUBLICATIONS

U.S. Appl. No. 13/890,604, filed May 9, 2013, Zeger, et al.
U.S. Appl. No. 13/655,034, filed Oct. 18, 2012, Medard, et al.
U.S. Appl. No. 14/208,683, filed Mar. 13, 2014, Calmon, et al.
U.S. Appl. No. 14/668,185, filed Mar. 25, 2015, Medard, et al.
Responce dated Oct. 6, 2015, to Office Action dated Jul. 9, 2015; for U.S. Appl. No. 14/013,324; 10 Pages.
"Data Service Option for Spread Spectrum Systems: Radio Link Protocol Type 3;" 3GPP2 C.S0017-010-A; Version 2.0; Sep. 2005.
"Guest Editorial Wireless Video Transmission;" IEEE Journal of Selected Areas in Communications; vol. 28; No. 3; Apr. 2010; pp. 297-298.
Abichar, et al.; "WiMax vs. LTE: Who Will Lead the Broadband Mobile Internet?;" Mobile Copmuting; IEEE Computer Society; IT Pro May/Jun. 2010; pp. 26-32.
AbuZeid, et al.; "IR-HARQ vs. Joint Channel-Network Coding for Cooperative Wireless Communication;" Cyber Journal: Multidisciplinary Journals in Science and Technology, Journal of Selected Areas in Telecommunications (JSAT); Aug. 2011; pp. 39-43.
Acedanski, et al.; "How Good is Random Linear Coding Based Distributed Network Storage?;" Proc. $1^{st}$ Workshop on Network Coding, Theory, and Application (Netcod'05); Apr. 2005; 6 pages.
Adamson, et al.; "Multicast Negative-Acknowledgement (NACK) Building Blocks;" Internet Engineering Task Force (IETF),RFC; vol. 5401; Nov. 2008; 42 pages.
Adamson, et al.; "NACK-Oriented Reliable (NORM) Transport Protocol;" Internet Engineering Task Force (IETF); RFC ; vol. 5740; Nov. 2009; 94 pages.
Adamson, et al.; "Quantitative Prediction of NACK-Oriented Reliable Multicast (NORM) Feedback," Proceedings, MILCOM 2000; vol. 2; Oct. 2002; 6 pages.
Ahlswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communcation Costs;" IEEE Forty-Ninth Annual Allerton Conference—Allerton House: Sep. 28-30, 2011; pp. 1358-1365.
Awerbuch, et al.; "On-Line Generalized Steiner Problem;" Proceedings of the $7^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Bellare, et al.; "A Concrete Security Treatment of Symmetric Encryption: Analysis of the DES Modes of Operations;" Proc. $38^{th}$ Annual Symposium on Foundations of Computer Science; Oct. 1997; pp. 1-32.
Berman, et al.; "Improved Approximations for the Steiner Tree Problem;" Journal of Algorithms; Chapter 39; pp. 325-334.
Bhandra, et al.; "Looking at Large Networks: Coding vs. Queuing;" Proc. of the $25^{th}$ IEEE International Conference on Computer Communications (INFOCOM); Apr. 2006; 12 pages.
Bharath-Kumar, et al.; "Routing to Multiple Desatinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Birk, et al.; "Judicious Use of Redundant Trandmissions in Multichannel ALOHA Networks with Deadlines;" IEEE Journal on Selected Areas in Communications; vol. 17; No. 2; Feb. 1999; pp. 257-269.

Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distibuted Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distibuted Systems; vol. 21; No. 10; Oct. 2010; pp. 1398-1411.
Cai, et al.; "Securing Network Coding;" IEEE; ISIT; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entrophy Combinatorial Optimization Problems;" Data Structure and Algorithms, Discrete Mathematics; Aug. 17, 2010; pp. 1-16.
Castro, et al.; "Upper and Lower Error Bounds for Active Learning;" The 44'th Annual Allerton Conference on Communication, Control and Computing; vol. 2, No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineeing and Computer Science; May 2007; 127 pages.
Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the $9^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudeo-ARQ for Reciever-driven Layered Multicast of Audio and Video;" Data Copmression Conference (DCC), 2000; Proceedings; Jan. 2000; 10 pages.
Chou, et al.; "Practical Network Coding;" Proceedings of the $41^{st}$ Annual Allerton Conference on Communication, Control, and Computing; Oct. 2003; 10 pages.
Cisco Visual Networking Index; Forecast and Methodology; 2009-2014; White Paper; Jun. 2, 2010; pp. 1-7.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC Approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.

(56) References Cited

OTHER PUBLICATIONS

Cloud, et al.; "Multi-Path TCP with Network Coding;" Wireless@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. of the $42^{nd}$ Allerton Conference on Communication, Control and Computing; Jan. 2004; 10 pages.
Deb, et al.; "On Random Network Coding Based Information Disseminations;" Proc of the IEEE International Symposium on Information Theory (ISIT); Sep. 4-9, 2005; 5 pages.
Derners, et al.; "Epidemic Algortihms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The $7^{th}$ International Telecommunications Symposium (ITS 2010); 2010; 5 pages.
Dimakis, et al.; "A Survey on Network Codes for Distributed Storage;" Proceedings of the IEEE; vol. 99; No. 3; Mar. 2011; pp. 476-489.
Dimakis, et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed-and Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparison of Type I, II and III Hybrid ARQ Schemes on AWGN Channels;" 2004 IEEE International Conference on Industrial Technology (ICIT); vol. 3; Dec. 8-10, 2004; pp. 1417-1421.
Eryilmaz, et al.; On Delay Performance Gains From Networking Coding; Information Sciences and Systems; 2006 $40^{th}$ Annual Conference on Mar. 22-24, 2006; 7 pages.
Fan, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010 $48^{th}$ Annual Allerton Conference, IEEE; Sep. 29, 2010; pp. 152-159.
Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" $47^{th}$ Annual Allerton Conference, IEEE; Sep. 30, 2009; pp. 447-454.
Feizi, et al; "Cases Where Finding a Minimum Entropy Coloring of a Charactertistic Graph is a Polynomial Time Problem;" IEEE International Symposium on Information Theory; Jun. 13, 2010; pp. 116-120.
Ferner, et al.; "Toward Sustainable Networking: Storage Area Networks with Network Coding;" Fiftieth Annual Allerton Conference; IEEE; Oct. 1-5, 2012; pp. 517-524.
Ford, et al.; "TCP Extensions for Multipath Operations with Multiple Addresses;" Internet draft, draft-ford-mptcp-multiaddressed-03; Work in Progress, Mar. 2010; pp. 1-36.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-muitiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al.; "Media Streaming With Network Diversity;" Invited Paper; Proceedings of the IEEE; vol. 96; No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007: pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008: The $27^{th}$ Conference on Computer Communications IEEE; Apr. 13-18, 2008; 5 pages.
Gheorghiu, et al.; "Multipath TCP with Network Coding for Wireless Mesh Networks;" IEEE Comunications (ICC) 2010 International Conference; May 23-27, 2010; 5 pages.
Gheorghiu, et al.; "On the Performance of Network Coding in Muiti-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom: Apr. 2006; 13 pages.
Gollakota, et al.; "ZigZag Decoding: Combating Hidden Terminals in Wireiess Networks;" SIGCOMM 08; Aug. 17-22; pp. 159-170.
Golrezaei, et al.; "FemtoCaching: Wireless Video Content Delivery Through Distributed Caching Helpers;" arXiv:1109.4179v2; Apr. 7, 2012; pp. 1-11.
Grant, et al.; "Graph Implementation for Nonsmooth Convex Programs;" LNCIS 371; Spring-Verlag Limited; Jan. 2008; pp. 95-110.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect," IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler, et al.; "Optimality of Network Coding in Packet Networks," ArXiv; Feb. 17, 2011; 5 pages.
Haeuplerl; "Analyzing Network Coding Gossip Made Easy;" Proc. of the $43^{rd}$ Symposium on Theory of Computing (STOC); Jan. 2011, 13 pages.
Haley, et al.; "Reversible Low-Density Parity-Check Codes;" IEEE Transactions on Information Theory; vol. 55; No. 5; May 2009; pp. 2016-2036.
Halloush, et al.; "Network Coding with Muiti-Generation Mixing: Analysis and Applications for Video Communication;" IEEE International Conference on Communications: May 19, 2008: pp. 198-202.
Han, et al.; "Multi-Path TCP: A joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Network Coding for Security;" IEEE Military Communications Conference; Oct. 2007; pp. 1-6.

(56) References Cited

OTHER PUBLICATIONS

Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52: No. 10; Oct. 2006; pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Network Coding from a Network Flow Perspective;" ISIT; Jun.-Jul. 2003; 6 pages.
Ho, et al.; "On Randomized Network Coding;" Proceedings of the $41^{st}$ Annual Allerton Conference on Communications, Control and Computing; Oct. 2003; 10 pages.
Ho, et al.; "On the utility of network coding in dynamic environments," International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling: FCFS vs. SSTF Revisited;" Communications of the ACM; vol. 23; No. 11; Nov. 1980; pp. 645-653.
Hong, et al.; Network-coding-based hybrid ARQ scheme for mobiie relay networks; Electronics Letters; vol. 46; No. 7; Apr. 1, 2010; 2 pages.
International Disk Drive Equipment and Materials Assoc.; "Advanced Standard;" In Windows Hardware Engineering Conf.; May 2005; 11 pages.
Iyer, et al.; "Anticipatory scheduling: A disk scheduling framework to overcome decpetive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video," ACM Sig-Comm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" Transactions on Device and Materials Reliability; vol. 11 No. 1; Mar. 2011; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Randsom Network Coding Helpful in WiMax;" IEEE $27^{th}$ Conference on Computer Communications; Apr. 2008; 5 pages.
Jolfaei, et al.; "A New Efficient Selective Repeat Protocol for Point-To_Multipoint Communication:" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report Electronic Colloquium on Computational Complexity (ECCC) TR95-030; 1995; pp. 1-17.

Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in the Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-780.
Key, et al.; "Combinging Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 pages.
Kim, et al.; "Modeling Network Coded TCP Throughput: A Simple Model and its Validation"; Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et al.; "Modeling Network Coded TCP Throughput: A Simple Model and its Validation", arXiv: 1008.0420v1 [cs.IT] Aug. 2, 2010; 9 pages.
Kim, et al.; "Modeling Network Coded TCP Throughput: A Simple Model and its validation", Nov. 2010, Presentation; 19 pages.
Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding;" Distributed Computing Systems (ICDCS); 2011 $31^{st}$ International Conference on Jun. 2011; 11 pages.
Kritzner, et al.; "Priority Based Packet Scheduling with Tunable Reliability for Wireless Streaming;" Lectrue Notes in Computer Science; 2004; pp. 707-717.
Kuhn, et al.; "Distributed Computation in Dynamic Networks;" Proc. of the $42^{nd}$ Symposium on Theory of Computing (STOC); Jun. 5-8, 2010; 10 pages.
Lai; "Sequential Analysis: Some Classical Problems and New Challenges"; Statistica Sinica, vol. 11, No. 2; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006—Spring); IEEE $63^{rd}$; vol. 4; May 7-10, 2006; pp. 2052-2057.
Larsson; "Analysis of Multi-User ARQ with Multiple Unicast Flows Under Non-iid Reception Probabilities," Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?—An Analysis of Practical Wireless Network Coding;" INFOCOM 2008; The $27^{th}$ Conference on Copmuter Communications, IEEE; 2008; pp. 1040-1048.

(56) References Cited

OTHER PUBLICATIONS

Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9, No. 9; Sep. 2010; pp. 2689-2694.
Li, et al.; "Robust and Felxible Scalable Video Multicast with Network Coding over P2P Network;" $2^{nd}$ International Congress on Image and Signal Processing, IEEE: Oct. 17, 2009; pp. 1-5.
Li,et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-Peer Streaming and IP-TV; Aug. 31, 2007 ACM; 6 pages.
Luby, et al.; "The Use of Forward Error Correction (FEC) in Reliable Multicast;" Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al; "Broadcasting in Time-Division Duplexing: A Random Linear Network Coding Approach;" presented Switzerland: Conference: NetCod 2009, Lausanne, Switzerland: Jun. 2009; 6 pages.
Lucani et al; "On Coding for Delay—New Approaches Based on Network Coding in Networks with Large Latency;" Conference: ITA Workshop, San Diego, USA; Feb. 2009; 10 pages.
Lucani et al; "On Coding for Delay New Approaches based on Network Coding in Networks with Large Latency" Conference ITA Workshop San Diego, USA; Slide Presentation; Feb. 13, 2009; 11 pages.
Lucani et al; "Random Linear Network Coding for Time Division Duplexing: Energy Analysis;" Conferece: ICC 2009, Dresden, Germany; Jun. 2009; 5 pages.
Lucani et al; "Random Linear Network Coding for Time-Division Duplexing: when to stop talking and start listening;" Presentation in ICC; Slide Presentation; Jun. 16, 2009; 6 pages.
Lucani et al; "Random Linear Network Coding for Time-Division Duplexing: when to stop talking and start listening;" Presentation in INFOCOM: Slide Presentation: Apr. 23, 2009; 10 pages.
Lucani et al; "Random Linear Network Coding for Time-Division Duplexing: Queueing Analysis;" Conference ISIT 2009, Seoul, Korea; Jul. 2009; 5 pages.
Lucani et al; "Random Linear Network Coding for Time-Division Duplexing: Field Size Considerations;" Conference: GLOBECOM 2009, Hawaii, USA; Dec. 2009; 6 pages.
Lucani, et al.; "Network Coding For Data Dissemination: It is Not What You Know, but What Your Neighbors Don't Know;" Modeling and Optimization in Mobile, AdHoc, and Wireless Networks 2009; WIOPT 2009; $7^{th}$ International Symposium on Jun. 23-27, 2009; pp. 1-8.
Lucani, et al.; "Network Coding Schemes for Underwater Networks;" WUWNet 07; Sep. 14, 2007; pp. 25-32.
Lucani, et al.; "Systematic Network Coding for Time-Divison Duplexing;" Proceedings of the IEEE International Symposium on Information Theory (ISIT); ; Jun. 13-18, 2010; pp. 2403-2407.
Lun, et al.; "Further Results on Coding for Reliable Communication over Packet Networks;" Information Theory, ISIT 2005 Proceedings International Symposium on Sep. 4-6, 2005; 5 pages.
Lun, et al.; "On Coding for Reliable Communication Over Packet Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun, et al.; An Analysis of Finite-Memory Random Linear Coding on Packet Streams; Modeling and Optimization in Mobile, Ad Hoc and Wireless Networks; Apr. 3-6, 2006; pp. 1-6.
Lun; "Efficient Operation of Coded Packet Networks;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491.
Mallat, et al.; "Adaptive Covariance Estimation of Locally Stationary Processes;" Annals of Statistics, vol. 26, No. 1; 1998; pp. 1-43.
Manssour, et al.; "A Unicast Retransmission Scheme based on Network Coding;" IEEE Transactions on Vehicular Technology; vol. 61; Issue 2; Nov. 2011; 7 pages.
Maymounkov, et al.; "Methods for Efficient Network Coding;" Proc. of the $44^{th}$ Allerton Conference on Communication, Control, and Computing; Sep. 2006; 10 pages.
Médard, et al.; "On Coding for Non-Multicast Networks;" invited paper, $41^{st}$ Allerton Annual Conference on Communication, Control; Outgrowth of Supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation," IEEE Transactions on Computers; vol. 45; No. 3; Mar. 1996; pp. 367-373.
Metzner; "An Improved Broadcast Retransmisson Protocal;" IEEE Transactions on Communications; vol. COM-32; No. 6; Jun. 1984; pp. 679-683.
Mosk-Aoyama, et al.; "Information Dissemination via Network Coding;" ISIT 2006; IEEE; Jul. 9-14, 2006; pp. 1748-1752.
Moyer, et al.; "A Survey of Security Issues in Multicast Communications;" IEEE Network; vol 13; No. 6; Nov./Dec. 1999; pp. 12-23.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen, et al.; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families of Ergodic Processes;" Bemoulli-London, vol. 12, No. 2; 2006; 21 pages.
Noguichi, et al.; "Performance Evaluation of New Multicast Architecture with Network Coding;" IEICE Transactions on Communication, E86-B; No. 6; Jun. 2003; 3 pages.
NS Version1—LBNL Network Simulator; web page—http://ee.lel.gov/ns/; Mar. 21, 2011; 3 pages.
Nyandoro, et al.; "Service Differentitation in Wireless LANs vased on Capture;" IEEE GLOBECOM 2005; vol. 6; Dec. 2005; 5 pages.
Oilveira, et al.; "A Network Coding Approach to Secret Key Distribution;" IEEE Transactions on Information Forensics and Security; vol. 3; No. 3; pp. 414-423; Sep. 2008.
ParandehGheibi, et al.; "Access-Network Association Policies for Media Streaming in Heterogeneous Environment;" Apr. 2010; pp. 1-8.

(56) References Cited

OTHER PUBLICATIONS

Peng, et al.; "Research on Network Coding based Hybrid-ARQ Scheme for Wireless Networks;" Communication Systems (ICCS); 2010 IEEE International Conference on Nov. 17-19, 2010; pp. 218-222.

Popovci, et al.; "Robust, portable I/O Scheduling with Disk Mimic;" Proc. USENIX Annual Tech. Conf. San Antonio, Texas, Jun. 2003; 14 pages.

Quershi, et al.; "An Efficient Network Coding based Retransmission Algorithm for Wireless Multicast;" Personal, Indoor and Mobile Radio Communications, 2009 IEEE 20$^{th}$ International Symposium on Sep. 13-16, 2009; 5 pages.

Radunovic, et al.; "Horizon: Balancing TCP Over Multipie Paths in Wirelss Mesh Network;" Proc. 14$^{th}$ ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "Multi Packet Reception and Network Coding;" Presentation at The 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogenous and Heterogenous Links—A Method and Types Approach;" Signal, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv:1104.2941v2 [cs.NI] Sep. 10, 2011; 6 pages.

Rezaee, et al.; "Speeding Multicast by Acknowledgment Reduction Techniques (SMART) Enabling Robustness of QoE to the Number of Users;" IEEE Journal on Selected Areas in Communications; vol. 30, No. 7; Aug. 2012; pp. 1270-1280.

Rezaee, et al.; "Multi Packet Reception and Network Coding;" Military Communications Conference; 2010; MILCOM 2010; IEEE; Oct. 31, 2010-Nov. 3, 2010; pp. 1393-1398.

Rezaee; "Network Coding, Multi-Packet Reception, and Feedback, Design Toois for Wireless Broadcast Networks;" Submitted to Department of Electrical Engineering and Computer Science at Massachusetts Institute of Technology; Sep. 2011; 92 pages.

Riemensberger, et al.; "Optimal Slotted Random Access in Coded Wireless Packet Networks;" WiOPt 10; Modeling and Optimization in Mobiie, Ad Hoc and Wireless Networks; Jul. 13, 2010; pp. 374-379.

Roughgarden, et al.; "How Bad is Selfish Routing?" Journal of the ACM; vol. 49, No. 2; Mar. 2002; pp. 236-259.

Ruemmler, et al.; "An introduction to disk drive modeling;" IEEE Computers; vol. 27; No. 3; Mar. 17-29, 1994; 17 pages.

Ryabko, et al.; "On Hypotheses Testing for Ergodic Processes;" Information Theory Workshop; ITW'08; IEEE; 2008; pp. 281-283.

Sanders, et al.; "Polynomial Time Algorithms for Network Information Flow;" 15$^{th}$ ACM Symposium on Parallel Algorithms and Architectures; Jun. 2003; pp. 1-9.

Sayenko, et al.; "Performance Analysis of the IEEE 802.16 ARQ Mechanism;" MSWiM'07; Oct. 22-26, 2007; pp. 314-322.

Scharf; "MPTCP Application Interface Considerations draft-scharf-mptcp-ap-04;" Internet Engineering Task Force; Internet-Draft; Nov. 22, 2010; 26 pages.

Seferoglu, et al.; "Opportunistic Network Coding for Video Streaming over Wireless," Packet Video; Nov. 2007; 10 pages.

Sengupta, et al.; "An Analysis of Wireless Network Coding for Unicast Sessions: The Case for Coding-Aware Routing;" in INFOCOM 2007; 26$^{th}$ IEEE International Confernce on Computer Communications; Jun. 2007; 9 pages.

Servetto, et al.; "Constrained Random Walks on Random Graphs: Routing Algorithms for Large Scale Wireless Sensor Networks;" WSNA 02; Sep. 28, 2002; 10 pages.

Shenker, et al.; "Pricing in computer networks: reshaping the research agenda;" Telecommunications Policy; vol. 20, No. 3; Jan. 1996; pp. 183-201.

Sherali, et al.; "Recovery of primal solutions when using subgradient optimization methods to solve Lagrangian duals of linear programs;" Elsevier Operations Research Letters 19 (Jan. 1996), pp. 105-113.

Shields; "The Interactions Between Ergodic Theory and Information Theory;" IEEE Transactions on Information Theory, vol. 44, No. 6; Oct. 1998 pp. 2070-2093.

Shrader, et al.; "Systematic wireless network coding;" Military Conference, 2009; MILCOM 2009; IEEE; 7 pages.

Shrader, et al.; "Routing and Rate Control for Coded Cooperation in a Satellite-Terrestrial Network;" The 2011 Military Communications Conference—Track 2—Network Protocols and Performance; Nov. 7-10, 2011; pp. 735-740.

Shriver, et al.: "An analytic behavior model for disk drives with readahead caches and request reordering;"Proc. SIGMETRICS/Performance, Joint Conf. on Meas. and Modeling Comp. Sys.; ACM; Jan. 1998:; 10 pages.

Song, et al.; "Zero-Error Network Coding for Acyclic Networks;" IEEE Transactions on Information Theory; vol. 49, No. 12; Dec. 2003; pp. 3129-3139.

SongPu, et al.; Performance analysis of joint chase combining and network coding in wireless broadcast retransmisson; Wireless Communication, Network and Mobile Computing 2008; WiCOM '08, 4$^{th}$ International Conference on Oct. 12-14, 2008; pp. 1-4.

Soo Suh; "Send-On-Delta Sensor Data Transmission With a Linear Predictor;" Sensors; ISSN 1424-8220; vol. 7; No., 4; Apr. 26, 2007; pp. 537-547.

Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.

Sundaram, et al.; "Multirate Media Streaming Using Network Coding;" Proc. 43$^{rd}$ Allerton Conference on Communication, Control, and Computing; Sep. 2005; 7 pages.

Sundararajan, et al.; "ARQ for Network Coding;" ISIT Proc. of the IEEE International Symposium on Information Theory (ISIT); Jul. 6-11, 2008; pp. 1651-1655.

Sundararajan, et al.; "Network Coding Meets TCP; Theory and Implementation;" Proceedings of the IEEE; vol. 99, Issue 3; Mar. 2011; pp. 490-512.

Sundararajan, et al.; "Network coding meets TCP;" InfoCOM 2009; IEEE, Apr. 19-25, 2009; pp. 280-288.

Sundararajan, et al.; On Queueing in Coded Networks—Queue Size Follows Degrees of Freedom; IEEE Informations Theory Workshop on Information Theory for Wireless Networks (ITW); Jul. 1-6, 2007; 6 pages.

Teerapittayanon, et al.; "Network Coding as a WiMAX Link Reliability Mechanism;" Multiple Access Communication; Lectures Notes in Computer Science; vol. 7642; pp. 1-12; 2012.

Teerapittayanon, et al.; "Performance Enhancements in Next Generation Wireless Networks Using Network Coding: A Case Study in WiMAX;" Massachusetts Institute of Technology; Jun. 2012; 130 pages.

Thobaben; "Joint Network/Channel Coding for Multi-User Hybrid-ARQ;" Source and Channel Coding (SCC) 2008; 7$^{th}$ International ITG Conference on Jan. 14-16, 2008; 6 pages.

Tosun, et al.; "Efficient Multi-Layer Coding and Encryption of MPEG Video Streams;" Proc. 2000 IEEE International Conference on Multimedia and Expo; vol. 1; 2000; pp. 119-122.

Tosun, et al.; "Lightweight Security Mechanisms for Wireless Video Transmission;" Proc. Intl. Conference on Information Technology, Coding and Computing; Apr. 2001; pp. 157-161.

Tran, et al.; "A Hybrid Network Coding Technique for Single-Hop Wireless Networks;" IEEE Journal on Selected Areas in Communications; vol. 27; No. 5; Jun. 2009; pp. 685-698.

Tran, et al.; "A joint Network-Channel Coding Technique for Single-Hop Wireless Networks" Network Coding, Theory and Applications; 2008; NetCod 2008; Fourth Workshop on Jan. 3-4, 2008; pp. 1-6.

Trung, et al.; "Quality Enhancement for Motion JPEG Using Temporal Redundancies;" IEEE Transactions on Circuits and System for Video Technology, vol. 18; No. 5; May 2008; pp. 609-619.

(56) References Cited

OTHER PUBLICATIONS

Tsatsanis, et al.; "Network Assisted Diversity for Random Access Wireless Data Networks;" Signals, Systems & amp; Computers; IEEE; vol. 1; Nov. 1-4; 1988; pp. 83-87.

Valancius; et al.; "Greening the Internet with Nano Data Centers;" Proc. 5$^{th}$ International Conference on Emerging Networking Experiments and Technologies; CoNEXT 2009; ACM 2009; Dec. 1-4, 2009; pp. 37-48.

Vasudevan, et al.; "Algebraic Gossip on Arbitrary Networks;" arXiv:0901.1444; Jan. 2009; 5 pages.

Velambi, et al.; "Throughput and Latency in Finite-Buffer Line Networks," IEEE Transactions on Information Theory; vol. 57; No. 6; Jun. 2011, pp. 3622-3643.

Vien, al.; "Network Coding-based Block ACK for Wireless Relay Networks;" Proceedings of IEEE Vehicular Technology Conference (VTC2011—Spring); May 2011; 5 pages.

Vien, et al.; "Network Coding-based ARQ Retransmisson Strategies for Two-Way Wireless Relay Networks;" Software, Telecommunications and Computer Networks (SoftCOM) 2010; International Conference on Sep. 23-25, 2010; 5 pages.

Vilela, et al.; "Lightweight Security for Network Coding;" IEEE International Conference on Communications; May 2008; 5 pages.

Wang, et al.; "Capacity-Delay Tradeoff for Information Dissemination Modalitites in Wireless Networks;" in Information Theory; ISIT 2008; IEEE International Symposium; Jul. 2008; pp. 677-681.

Wang, et al.; "Embracing Interference in Ad Hoc Networks Using Joint Routing and Scheduling with Multiple Packet Reception;" in INFOCOM 2008; The 27$^{th}$ Conference on Computer Communications; IEEE; Apr. 2008; pp. 1517-1525.

Wang, et al.; Multipath Live Streaming via TCP: Scheme, Performance and Benefits; ACM Transactions on Multimedia Computing, Communications and Applications; vol. 5: No. 3; Article 25; Aug. 2009; pp. 1-23.

Widmer, et al.; "Network Coding for Efficient Communiation in Extreme Networks;" Applications, Technologies, Architectures, and Protocols for Computer Communications; Aug. 2005; pp. 284-291.

Wieselthier, et al.; "Energy Efficient Broadcast and Multicast Trees in Wireless Networks;" Mobile Networks and Applications 7; Jan. 2002; pp. 481-492.

Wieselthier, et al.; "Energy-Aware Wireless Networking with Directional Antennas; The Case of Session-Based Broadcasting and Multicasting;" IEEE Transactions on Mobile Computing; vol. 1, No. 3; Jul.-Sep. 1001; pp. 176-191.

Wilhelm; "An Anomaly in Disk Scheduling: A Comparison of FCFS and SSTF Seek Scheduling Using an Empiracle Model for Disk Access;" Communications of the ACM, vol. 19; No. 1; Jan. 1976; pp. 13-17.

Wu, et al.; "A Trellis Connectivity Analysis of Random Linear Network Coding with Buffering;" Proc. of the International Symposium on Information Theory (ISIT); Jul. 9-14, 2006; pp. 768-772.

Yazdi, et al.; "Optimum Network Coding for Delay Sensitive Applications in WiMAX Unicast;" IEEE INFOCOM 2009; Apr. 19-25, 2009; pp. 1576-2580.

Yeung; "Multilevel Diversity Coding with Distortion;" IEEE Transactions on Information Theory: vol. 41, No. 2; Mar. 1995; pp. 412-422.

Yong, et al.; "XOR Retransmission in Multicast Error Recovery;" Networks 2000; ICON; Proceedings IEEE International Conferece on Sep. 5-8, 2000; pp. 336-340.

Yun, et al.; "High-Throughput Random Access Using Successive Interference Cancellation in a Tree Algorithm," IEEE Transactions on Information Theory; vol. 53; No, 12; Dec. 2007; pp. 4628-4639.

Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.

Zegerl "Packet Erasure Coding with Random Access to Reduce Losses of Delay Sensitive Multislot Messages;" IEEE; Paper ID #900482; Aug. 18, 2009; pp. 1-8.

Zhang, et al.; "Collision Resolution in Packet Radio Networks Using Rotational Invariance Techniques;" IEEE Transactions on Communications; vol. 50; No. 1; Jan. 2002; pp. 146-155.

Zhang, et al.; "Optimized Multipath Network Coding in Loss Wireless Networks;" ICDCS '08 Proceedings of the 2008 The 28$^{th}$ International Conference on Distributing Computing Systems; Jan. 2008; 12 pages.

Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.

Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.

Zhao, et al.; "On analyzing and improving COPE performance;" Information Theory and Applications Workshop (ITA), Jan. 2010; pp. 1-6.

Zhu, et al.; "Multicast with Network Coding in Application-Layer Overlay Networks;" IEEE Journal on Selected Areas in Communications; vol. 22, No. 1; Jan. 2004; pp. 1-13.

PCT Search Report of the ISA for PCT/US2009/055359 dated Mar. 30, 2011.

Written Opinion of the ISA for PCT/US2009/055359 dated Mar. 30, 2011.

International Preliminary Report on Patentability of the ISA for PCT/US2009/055359 dated Apr. 21, 2011.

U.S. Appl. No. 13/291,310, filed Nov. 8, 2011.

\* cited by examiner

CODING APPROACH FOR A ROBUST AND FLEXIBLE COMMUNICATION PROTOCOL

CROSS REFERENCE TO RELATED APPLICATIONS

This application is a continuation of and claims the benefit of U.S. patent application Ser. No. 13/291,310 filed on Nov. 8, 2011 which is hereby incorporated by reference in its entirety.

STATEMENT REGARDING FEDERALLY SPONSORED RESEARCH

This invention was made with Government support under Contract No. W911NF-07-1-0029, awarded by the U.S. Army Research Office. The government has certain rights in this invention.

BACKGROUND OF THE INVENTION

As is known in the art, there have been several past attempts in using multiple paths for transport protocols, all of which consider end-to-end connection from a single server to a single client. For example, one of the latest such protocols introduced is Multi-Path Transmission Control Protocol (MPTCP).

Implementation of MPTCP can significantly improve the way current computer networks operate by using the resource pooling principle to improve the reliability and throughput of a data communication session. For example, if a communication path between a source and a destination breaks down, or becomes highly congested, data may be sent over alternative paths to thereby avoid any interruption in the data communication session. Moreover, MPTCP potentially enables a client, e.g. a mobile device, to simultaneously establish a connection through multiple interfaces.

Such interfaces can provide connections to a cellular network, wired and wireless Local Area Network (LAN), or other devices in an ad-hoc or peer-to-peer mode. This potentially provides robustness to link failures particularly in wireless networks as well as the ability to roam from one network to another.

Even though the desire for such benefits has increased with the emergence of more capable (in terms of computational power and communication interfaces) devices, current implementation suggestions by the Internet Engineering Task Force (IETF) working group have several issues.

For example, one problem in MPTCP is scheduling. The problem of scheduling in MPTCP involves partitioning the data across multiple paths, and dynamically re-adjusting the schedule based upon congestion feedback. Consider, for example, an MPTCP session with two paths. One may choose to assign odd-numbered packets to the first path, and the even-numbered packets to the second path. If the second path is congested and the first path is not, a delay may occur. If MPTCP does not re-adjust the load based upon congestion levels in each path, then the odd-numbered packets will be delivered (via the first path) while the even-numbered packets will delay the file transfer, (i.e. the second path is a bottleneck). Therefore, MPTCP has to dynamically re-adjust the load. However, this involves a delicate and complex control. For example, decisions must be made as to which fraction of the even-packets should be rescheduled to the first path, and how to notify the receiver of the new load balancing decisions, etc.

It would therefore, be desirable to provide one or more methods to facilitate the implementation of a multi-path protocol. It would be further desirable to provide one or more methods to facilitate the implementation of a transport protocol that can emulate current Transfer Control Protocol (TCP)/MPTCP interface (to higher and lower layers) and provide a more effective service.

SUMMARY OF THE INVENTION

In accordance with the concepts, systems and techniques herein, described are several methods to facilitate the implementation of a system and technique which uses a coded protocol and is suitable for use as a communication protocol including a multipath communication protocol. In one embodiment, the coded protocol may be implemented as a multi-path transport protocol that can emulate current TCP/MPTCP interface (to higher and lower layers) and provide a more effective service. When implemented at the transport later, the coded protocol technique described herein is referred to as Coded Transmission Control Protocol (CTCP).

It should be appreciated that even though the concepts, systems and techniques are sometimes described herein in the context of a transport protocol, the same concepts, systems and techniques may also be implemented in an application layer e.g. when an unreliable transport protocol such as the User Datagram Protocol (UDP) is in place, or in a link layer.

In accordance with the concepts, systems and techniques described herein, a communication protocol includes a method of delivering data (including but not limited to voice, image and video data) from a source to a destination by forming coded packets as a linear combination of original packets at the source and delivering the same coded packets to the destination over one or more network paths. The coded packets represent the data to be transmitted and no additional coding of the data is done between the source and destination.

With this particular arrangement a coding approach for a robust and flexible network communication protocol is provided. By using coding, it is possible to eliminate the need to track packet identities, and hence, it is possible to reduce coordination overhead associated with many conventional protocols. The concepts, systems and techniques described herein takes advantage of multiple paths, interfaces, mediums, servers, and storage locations available in a network. This allows one to provide a reliable service that is robust against failures. The coded protocol and related techniques allow quick response to congestion by load balancing over different network resources. The protocol and techniques also enable soft vertical hand-overs across heterogenous networks.

In one embodiment, the communication protocol further includes providing feedback from the destination to the source and based upon the feedback from the destination, forming a new linear combination of the original packets at the source and delivering the new coded packets from the source to the destination.

By utilizing feedback between the destination and source, different coded packets are repeatedly delivered until all of the original information (i.e. the data being delivered from the source to the destination) is received at the destination. In this manner, the communication protocol described herein guarantees delivery of all data.

In accordance with a further aspect of the concepts, systems and techniques herein, a transport protocol based on network coding for reliable data delivery includes a method of transmitting data from a source node to a destination node by forming a linear combination of packets at the source node and delivering the same linear combination of packets formed at the source node from the source node to the destination node over one or more network paths. The linear combinations of packets (coded packets) represent the data to be transmitted and no additional coding of the data is done between the source node and the destination node.

With this particular arrangement, a transport protocol based upon network coding for reliable data delivery is described. In one embodiment, a media file is divided into chunks and the transport protocol described herein is tailored to meet delay requirements of media streaming applications. Also described are different coding strategies for chunk delivery based upon an urgency level of each chunk. In one embodiment, a method and system based on network coding for design and implementation of a reliable transport protocol in a network is described. The transport protocol takes advantage of multiple paths, interfaces, and servers available in the network. This allows one to provide a reliable service that is robust against failures and can satisfy quality of service (QoS) requirements of delay sensitive applications such as video streaming. The transport protocol described herein allows quick response to congestion by load balancing over different network resources. The transport protocol and techniques described herein also enable soft vertical hand-over across heterogenous networks.

In one embodiment, the transport protocol technique further includes providing feedback from the destination node to the source node and then forming a new linear combination of packets at the source node and delivering the new combination of packets from the source node to the destination node.

In one embodiment, the process is repeated until all of the original data is decoded at the source node.

In one embodiment, the source is a server and the destination is a client.

In one embodiment, the plurality of packets represent a file.

In one embodiment, the technique is implemented in one of: a link layer, a transport layer; and an application layer.

In one embodiment, forming a linear combination of packets includes generating a linear combination of packets at random or deterministically.

In some embodiments, the linear combination of packets comprises all packets which make up the file and in other embodiments the linear combination of packets comprises a subset of the packets which make up the file.

In some embodiments, forming a linear combination of packets is done by forming a random linear combination of a subset of packets and in other embodiments, forming a linear combination of packets is done by choosing the coding coefficients deterministically. The subset of packets chosen to form linear combinations can be obtained in a deterministic or probabilistic fashion.

In some embodiments the coefficients of the linear combination are embedded within a payload.

In accordance with a still further aspect of the concepts, systems and techniques described herein, it should be appreciated that there exist scenarios in which where a client-device (e.g. a wireless mobile device) may not be able to connect simultaneously to two access points. This could be due to hardware constraints, such as the client-device having a single WiFi card thereby limiting the client-device to be associated with a single WiFi access point at any given point in time. This may pose a challenge to soft-handoff between two access points.

Thus, the coded protocol concepts, systems and/or techniques described may be used to form a method of soft-handoff where there is an intermediate means of access available between two access points. In one embodiment, first and second different access points utilize first and second WiFi networks and an intermediate means of access corresponds to a 3G or a 4G network. Even though the client-device may not be able to simultaneously establish two WiFi connections, the coded protocol concepts, systems and techniques described herein, allow the client-device (e.g. a mobile device) to seamlessly transfer a connection from the first WiFi network to the intermediate 3G (or 4G) network and then from the intermediate 3G (or 4G) network to the second WiFi network. In this manner, a data transfer session will be uninterrupted when client-devices move from the first access point (i.e. the first WiFi network) to the second access point (i.e. the second WiFi network).

In accordance with a still further aspect of the concepts, systems and techniques described herein, in a communication system in which a client-device cannot connect to a server simultaneously through first and second access points, a method for transferring an ongoing data session between the first and second access points includes establishing a first connection between the client-device and the server via the first access point, and establishing a second connection between the client-device and server via an intermediate access point wherein at least one of the connections between the first and second access points is provided via a coded protocol.

With this particular arrangement, a communication system is provided in which a client-device can connect to a server through first and second access points via an intermediate access point, wherein each of the first and second access points and intermediate access point are implemented with the same or different access technologies.

Once the second connection is established between the client-device and server via the intermediate access point, in one embodiment, the method further includes terminating the first connection through the first access point. The method can then further include establishing a third connection between the client-device and the server via a third access point. It should be appreciated that at least one of the connections between the first and second access points is provided via a coded protocol.

In one embodiment a first one of the first access point, the second access point and the intermediate access point utilizes one of WiFi access technology, Bluetooth access technology, 3G access technology or 4G access technology.

In accordance with a further aspect of the communication protocol concepts, systems and techniques described herein, a method for transmitting a file between one or more servers and one or more clients includes (a) for M information packets, generating $N_M$ linear coded packets at one of the one or more servers, (b) delivering the $N_M$ linear coded packets from the server to one of the one or more clients, (c) upon reception of the some of the $N_M$ linear coded packets at the client, occasionally but continuously providing feedback from the client to the server from which packets were received, (d) based upon the feedback from the client, forming a new linear combination of coded packets at the server and (e) delivering the new combination of coded packets from the server to the client.

With this particular arrangement, an efficient and robust method for transmitting a file between one or more servers and one or more clients is provided. The sequence of providing feedback from the client to the server and sending new coded packets from the server based upon the feedback is continued until the entire original file is decoded at the client. In one embodiment, the packets are delivered by transmitting $N_M$ linear coded packets having a fixed packet size.

In accordance with a still further aspect of the concepts, systems and techniques described herein, a method for transmitting original information between one or more sources and one or more destinations includes (a) for M information packets, generating $N_M$ linear coded packets at one of the one or more servers, wherein the M information packets represent all of the original information to be transmitted from at least one of the one or more sources to one of the one or more destinations, (b) delivering the $N_M$ linear coded packets from the source to one of the one or more destinations, (c) upon reception of some of the $N_M$ linear coded packets at the destination, providing feedback from the destination, (d) based upon the feedback provided from the destination to the source, forming a new linear combination of coded packets at the source and (e) delivering the new combination of coded packets from the source to the destination. The sequence of providing feedback from the destination to the source and forming and resending coded packets at the source is continued until the entire original file is decoded at the destination.

With this particular arrangement, a transport protocol which facilitates the implementation of a multi-path transport protocol that can emulate current TCP/MPTCP interface (to higher and lower layers) and provide a more effective service is provided. By using network coding, it is possible to eliminate the need to track the identity of each packet, and hence, it is possible to remove the coordination overhead associated with many conventional transport protocols. The proposed method takes advantage of multiple paths, interfaces, mediums, servers, and storage locations available in the network. This allows one to provide a reliable service that is robust against failures. The proposed protocol allows quick response to congestion by load balancing over different network resources. The method also enables soft vertical hand-over across heterogenous networks. This transport protocol can be tailored to meet the delay requirements of media streaming applications, by dividing the media file into small chunks. Different coding strategies for chunk delivery based upon an urgency level of each chunk may also be used.

It should be appreciated that even though the concepts, systems and techniques described are presented as a transport protocol, after reading the disclosure provided herein, it should be understood that the same communication protocol concepts, systems and techniques may be implemented in other layers of a networking protocol suite including but not limited to an application layer or a link layer.

Thus, it should be understood that the coding techniques and control methods described herein are not limited to implementation in the transport layer of a network protocol stack. Rather, the proposed concepts and techniques may be implemented in other layers such as the physical layer, link layer, network layer, and application layer. Moreover, depending upon the layer in which the method described herein is implemented, the size of the data units (packets) and the time scale of the coding operations may vary. Nevertheless, concepts and advantages described herein such as soft vertical-handoff, dynamic load balancing, and ability to maintain multiple connections simultaneously across different interfaces still apply.

Implementing the techniques described herein in the application layer can be achieved by, for instance, tunneling the traffic over a UDP connection. All the coding operations and the control algorithm are performed at the application layer on top of UDP. In this setup, the coding operation is performed in an end-to-end manner, similar to using CTCP at the transport layer.

Another example involves coding at the link layer. Since link layer manages each link individually, the coding operation implemented at the link layer is also on a per-link basis, and is no longer performed in an end-to-end manner. Again, this approach enables seamless connection and hand-over across multiple access technologies such as WiFi, LTE, WiMax, HSPA, etc . . . .

BRIEF DESCRIPTION OF THE DRAWINGS

The foregoing features of this invention, as well as the invention itself, may be more fully understood from the following description of the drawings in which:

FIG. 4A is an example of a transition strategy in which a source continues to transmit coded packets from a current block (chunk) until enough degrees of freedom are acknowledged by a source;

FIG. 4B is an example of a transition strategy in which a source begins sending coded packets from the next block and if any packet loss is detected, the source retransmits a coded packet for the corresponding block;

FIG. 4C is an example of a transition strategy in which a source begins sending coded packets and a transition is deferred until the end of the next block at which point the source sends coded packets from both blocks.

DETAILED DESCRIPTION OF ILLUSTRATIVE EMBODIMENTS

Figure 1:
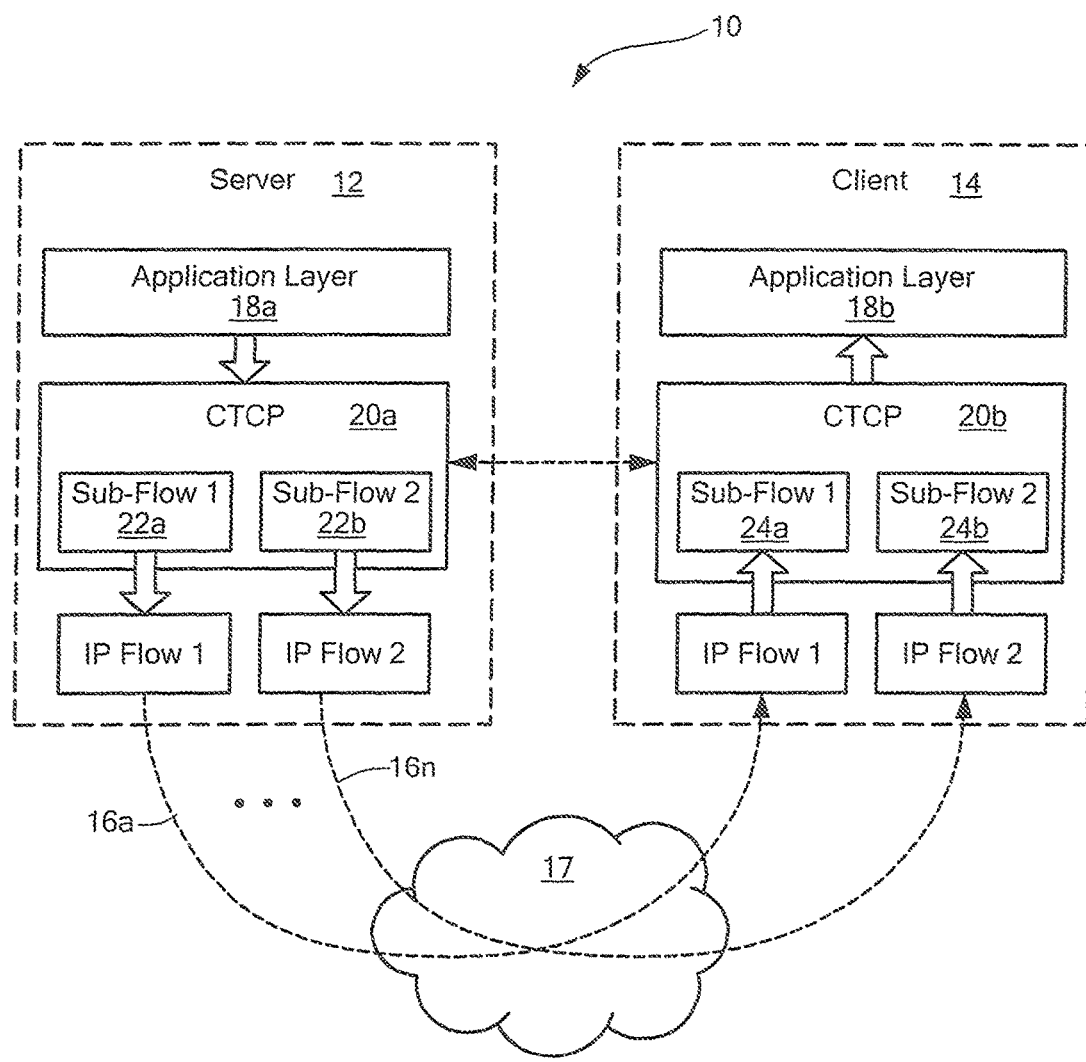
FIG. 1 is a block diagram of a coded transmission control protocol (CTCP) in a protocol stack for a single connection between a server and a client through one or more network paths/interfaces. The IP addresses of the CTCP subflows can be the same or different.

Before describing a robust and flexible network communication protocol and methods, some introductory concepts and terminology are explained.

Reference is sometimes made herein to "data." As used herein, data can include any type of data including, but not limited to voice, image and video. Thus, reference made herein to a "data session" is not limited to any particular type of data.

It should be understood that reference is also sometimes made herein to implementation of a protocol on a specific network layer or layers including, but not limited to: transport layers, link layers and application layers. In one exemplary embodiment described herein, a so-called Coded Transmission Control Protocol(CTCP) is described at the transport layer. Such reference is not intended as, and should not be construed as limiting of the communication coded protocol concepts described herein. Rather, such references and examples are given merely to promote clarity in the description of the coded protocol concepts described herein.

Accordingly, it should be understood that the coding system and techniques and control methods described herein are not limited, for example, to implementation in a transport layer of the network protocol stack. Rather, the proposed concepts and techniques may be implemented in other layers such as the physical layer, link layer, network layer, and application layer. Moreover, depending upon the layer in which the method described herein is implemented, the size of the data units (packets) and the time scale of the coding operations may vary. Nevertheless, concepts and advantages described herein such as soft vertical-handoff, dynamic load balancing, and ability to maintain multiple connections simultaneously across different interfaces still apply.

It may be desirable, for example, to implement the coded protocol techniques described herein in an application layer when an unreliable or undesirable transport protocol is in place. For example, when a network operates with the User Datagram Protocol (UDP), it may be desirable to implement the coded protocol technique in an application layer. Implementing the coded communication protocol techniques described herein in the application layer can be achieved, for instance, by tunneling the traffic over a UDP connection. In such an embodiment, all coding operations and control techniques are performed at the application layer on top of UDP. In such an arrangement, the coding operation is performed in an end-to-end manner (similar to using CTCP at the transport layer as mentioned above). The manner in which such an arrangement may be implemented will be understood by those of ordinary skill in the art.

Another example involves coding at the link layer. Since link layer manages each link individually, the coding operation implemented at the link layer is also on a per-link basis, and is no longer performed in an end-to-end manner. Again, one may achieve seamless connection and hand-over across multiple access technologies such as WiFi, LTE, WiMax, HSPA, etc . . . with a link layer implementation of the concepts described herein.

Determining where (i.e. on which layer) to implement the coded communication protocol described herein depends upon a variety of factors including but not limited to delay constraints, hardware constraints, software constraints, which layers are accessible for changes/modifications, ease of integration to existing system, It should be understood that in any particular application, these factors may be weighted differently (i.e. some factors may be more important in one case and the same factors may be less important in another case). In any given application, one of ordinary skill in the art will understand how to evaluate such factors and select the particular layer or layers in which to implement the coded protocol described herein. Thus, it should be understood that in some applications it may be desirable to implement the coded protocol techniques described herein in a physical layer or a link layer while in other applications it may be desirable to implement the coded protocol techniques in the transport layer or application layer.

Referring now to FIG. 1, a client-server system 10 includes a server 12 coupled to a client 14 through one or more paths 16a-16n portions of which paths may include the Internet. Server 12 and client 14 each include application layers 18a, 18b which operate in accordance with a coded transmission control protocol within a protocol stack (i.e. a software implementation of a computer networking protocol suite) 20a, 20b respectively. Thus FIG. 1 illustrates a coded transmission control protocol (CTCP) as the transport layer 20c, 20b for a single connection between a server 12 and a client 14. The IP address of the CTCP subflows can be the same or different. As is known, individual protocols typically exist within a suite.

Consider now the following scenario of transmitting a single file from server 12 to client 14. The CTCP protocol establishes multiple sub-flows, which can use possibly different ones of network paths 16a-16n.

For the given file, conventional multipath transmission control protocol (MPTCP) needs to map each byte or packet to different subflows 22a . . . 22n (e.g. as in the paths 16a . . . 16n), and each sub-flow operates as a conventional Transmission Control Protocol (TCP) on the assigned bytes. However, this is extremely complicated to manage, especially in a dynamic setup (e.g. when network condition changes over time across different paths.

In order to avoid tracking the sequence number of each packet through each path, the network coding protocol as described below in conjunction with CTCP is used.

Each of the sub-flows of CTCP, whenever allowed to transmit, forms a linear combination of the packets within the file and hands this combination to the IP layer for delivery. The linear combination can be generated at random or deterministically involving all or any subset of the packets within the file. The coding strategy may affect the decoding complexity at the receiver 14. A particularly efficient coding method is to form a random linear combination of a small subset of packets, which may be chosen at random or deterministically.

It is important to ensure that CTCP's packet structure is compatible with traditional TCP or UDP's packet structure so that the nodes within the network, such as current implementation of middle boxes and Network Address Translations (NATs), can operate without modification. In one embodiment, the coefficients of the linear combination are embedded within the payload so that they can be used for decoding.

Figure 2:
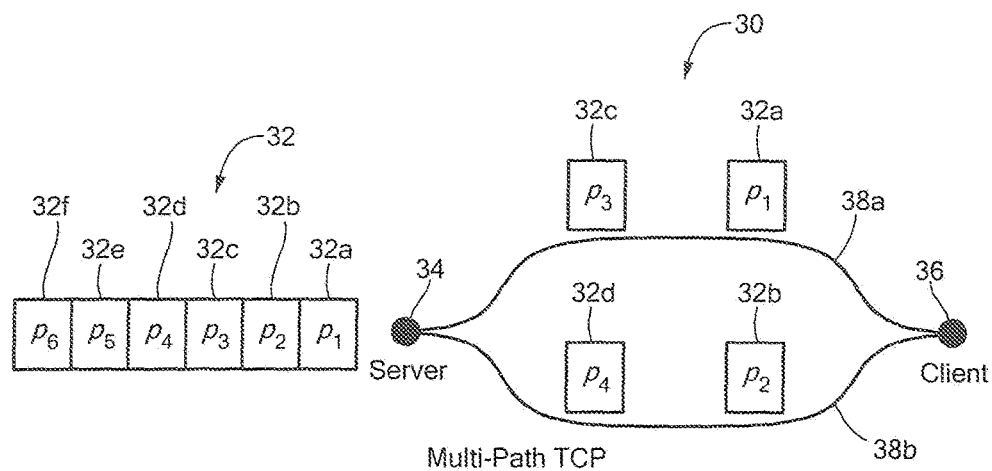
FIGS. 2 and 2A are examples of CTCP sending coded packets through multiple paths.
Figure 2A:
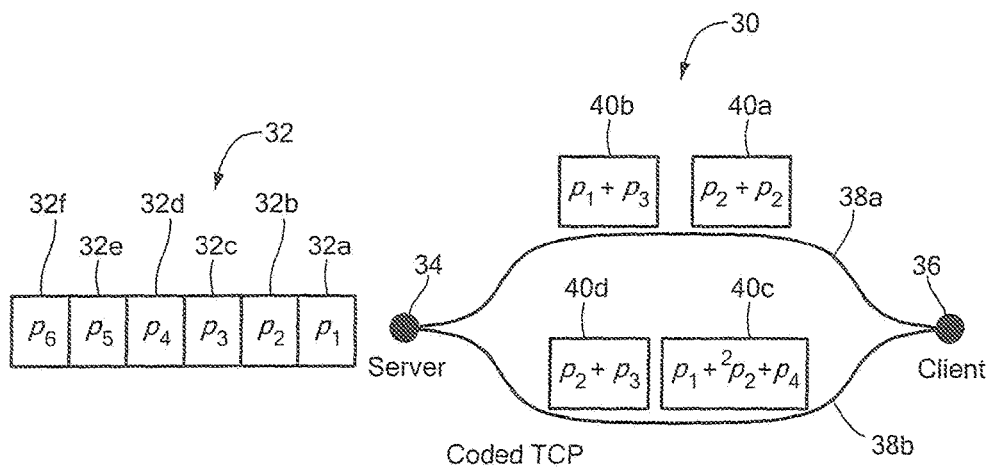

Referring now to FIGS. 2 and 2A, a comparison of multi-path TCP (MPTCP) and CTCP is shown. In FIG. 2, MPTCP divides even and odd numbered packets for transmission, i.e. $P_1$ $P_3$, and $P_5$ to a first path 38a and $P_2$, $P_4$, and $P_6$ to a second different path 38b If a packet, for example packet $P_3$, is lost, then MPTCP must retransmit packet $P_3$. Therefore, MPTCP needs to decide which path over which to retransmit packet $P_3$.

In order to fully utilize the diversity of the network, server 34 may choose to transmit packet $P_3$ over both paths; however, this can lead to redundancy and waste of bandwidth. To be bandwidth efficient, MPTCP may choose to transmit packet $P_3$ only over a single path (e.g. path 38a) but this risks delaying the entire transmission because of the path 38a being the slower of the two paths 38a, 38b, i.e. the bottleneck path.

On the other hand, in FIG. 2A, CTCP forms a linear combination of the available packets 32a-32f generally denoted 32. In order to decode, the receiver needs a predetermined number of linearly independent combinations of the packets 32 (e.g. any four linearly independent combinations of the packets), defined as degrees of freedom. If one of coded packets 40a, 40b, 40c, 40d are lost, server 34 may choose multiple linearly independent combinations of the packets 32 for transmission on paths 38a, 38b. If all packets (e.g. 40a, 40b or 40c, 40d and the newly generated packet) get delivered, then both packets can be used for decoding in the future; thus, the receiver now only needs one more degree of freedom to decode.

In contrast to the novel CTCP concepts, traditional TCP flows use a sliding window mechanism for congestion management. TCP's congestion window denotes a contiguous subset of the data that can be transmitted without being acknowledged yet. As acknowledgments arrive at the sender, TCP may slide its congestion window to transmit more data. The size of the congestion window can change over time, based upon the behavior of the received acknowledgements and the round-trip time (RTT) estimate.

In order to take advantage of coding, CTCP modifies the notion of sliding/congestion window. Since coding removes the identity of a transmitted packet, in order to limit the congestion in the network, each transmitted packet should correspond to a particular token available at the sender. The total number of tokens corresponds to the size of the congestion window in the traditional TCP. CTCP uses an acknowledgement mechanism based upon the degrees of freedom received. In particular, the receiver/client 36 examines each delivered coded packet. If it is linearly independent from the past received packets, the receiver acknowledges the degree of freedom. This acknowledgement can involve a sequence number for queue management at the sender. Further, the acknowledgements can be used for congestion estimation and control. When an acknowledgement is received, a token is returned to the sender. Thus, the sender is allowed to transmit an additional coded packet.

The tokens can be generated or removed based upon a congestion control mechanism. For example, if multiple packets are lost or congestion is detected via longer RTT estimates, it may be desirable to decrease the rate of transmission by removing a few tokens. Also, it may be desirable to generate new tokens if there is enough bandwidth available for the particular sub-flow. This token-based congestion control mechanism allows each sub-flow to achieve the largest throughput despite the losses and failures without overflowing the network.

It should be noted that in a lossy environment, TCP mistakes the losses as congestion, which leads to TCP's performance degradation. A recent improvement to TCP congestion control is the so-called "fast-retransmit mechanism." Fast-retransmit involves re-transmitting a particular lost packet to continue the TCP flow, which requires in-order delivery.

With CTCP, however, a lost packet can be substituted by any other coded packet. Thus, CTCP does not need a fast-recovery mechanism. Rather, CTCP detects failures by assigning a timer (e.g. TTL) to each token. When failures are detected, CTCP may re-generate the token and retransmit a coded packet.

Figure 3:
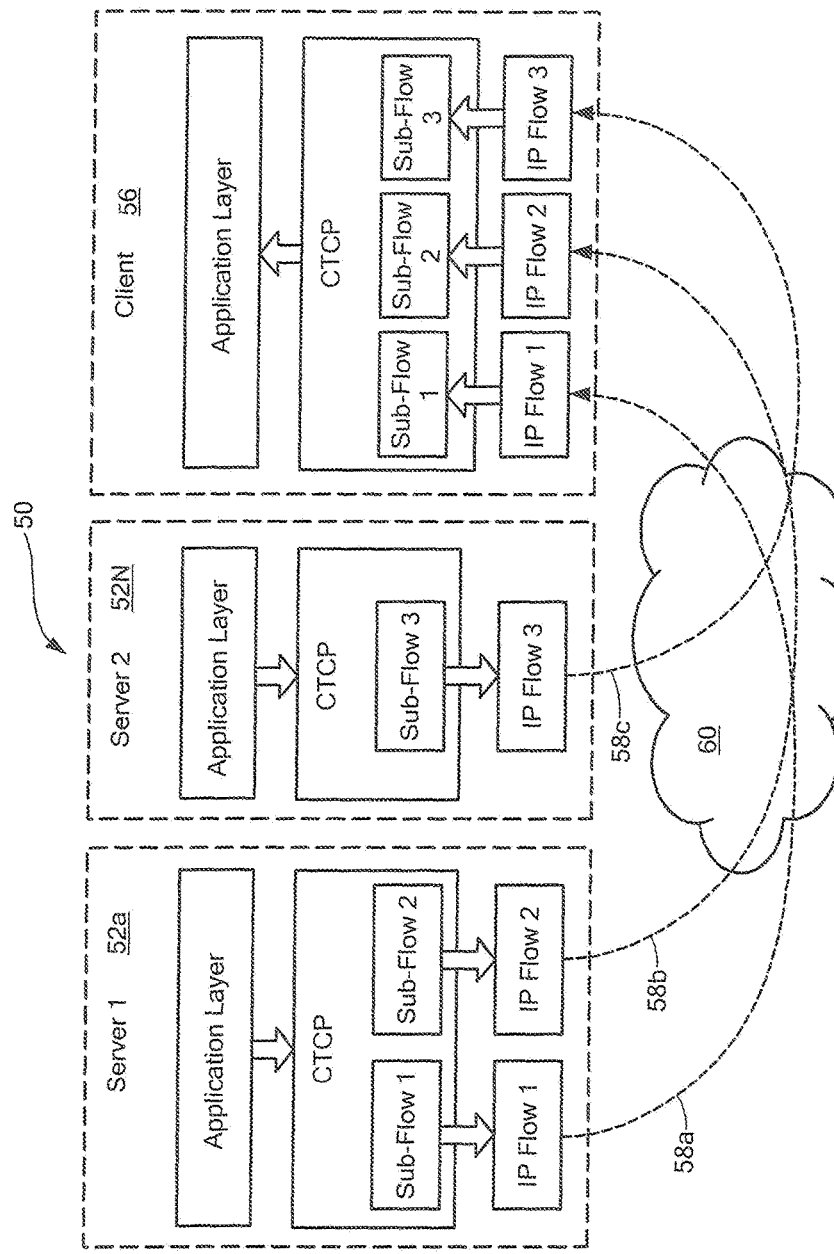
FIG. 3 is an example of CTCP with multiple servers.

Referring now to FIG. 3, a client-server system includes multiple servers 52a-52N (here only two servers being shown for clarity) (generally denoted S) and at least one client 56C. Servers S utilize one or more of multiple paths to couple to each of the one or more clients C. In the exemplary embodiment of FIG. 3, only three paths 58a-58c are shown although any number of paths may also be used. The servers S and clients C each include an application layer which operates via CTCP. One of the main advantages of CTCP is that it allows the receiver 56 to use multiple paths (e.g. paths 58a-58c) and/or multiple servers (e.g. servers 52a, 52b) simultaneously. This can be accomplished without the servers coordinating with each other.

It should be appreciated that MPTCP cannot achieve this without close coordination among the servers. Thus, MPTCP does not scale the way CTCP can.

When using CTCP, each sub-flow (which can be on different servers) forms the coded packets independently; moreover, the congestion control mechanism for each sub-flow can operate without direct rate coordination with other sub-flows. Therefore, each sub-flow can achieve the maximum throughput available without overloading the network. By properly generating the acknowledgements at the client side, the receiver can control the rate at which each sub-flow generates coded packets. For example, the receiver can prematurely acknowledge receiving some degrees of freedom over a particular sub-flow to force that sub-flow from sending more coded packets. Also, the receiver may delay sending acknowledgements or not send acknowledgements of packets that it has received. Thus, the receiver can control the amount of redundancy introduced by the sub-flows. The amount of redundancy should be sufficient to battle the losses in the network; however, small enough to avoid wasting network resources.

Another advantage of CTCP is that it can take advantage of distributed storage. Not only can CTCP use multiple servers, CTCP clients can recover the entire file or data even if the file is scattered over the network. For example, instead of storing multiple copies of a particular file, coded partial copies of the file may be formed and stored at various locations (e.g. at some edge servers or close to cellular base stations). This method of distributed storage is resilient to storage failures and requires smaller storage space.

In addition to using multiple servers and distributed storage, CTCP can establish connections through different interfaces and medium simultaneously. For example, consider a device with 3G, WiFi, and Bluetooth interfaces. Current implementations do not allow the device to use multiple interfaces at the same time. For instance, even if both 3G and WiFi are enabled on the device, the WiFi interface is the active network interface for data communication and the 3G interface acts as a backup to the WiFi connection. This restriction of the current implementations comes primarily from the fact that it is difficult to coordinate transfer of packets across multiple paths/flows/interfaces. On the other hand, CTCP alleviates the need of coordination among different paths/flows/interfaces by using coding.

One of the key benefits of CTCP is its extreme resilience to network failures. By taking advantage of multiple paths/flows/interfaces, CTCP is able to establish and maintain the connection even if part of the network fails. For example, suppose that both 3G and WiFi are active simultaneously on a device. If WiFi fails, then 3G can help maintain the connection without incurring any delay associated with initialization/handshaking, which is necessary in the current implementations. Moreover, CTCP can readily provide seamless soft horizontal and vertical hand-over across different access points, access technologies/interfaces, and networks.

In order for the receiver to decode the data, it needs to collect enough degrees of freedom. As a result, the coding operation performed by CTCP may seem that it will incur a higher delay in delivering data to the application. This may make CTCP less appealing for delay-sensitive applications, such as media streaming. However, described below is a method to both reap the benefit of coding (as mentioned above) and meet the delay constraints of the applications.

By constraining the set of packets combined together, one can control the number of successful transmissions needed to deliver a particular subset of the packets. For example, a media file can be divided into chunks, i.e. small file portions or units from an application point of view but large enough to leverage the benefits of coding. A chunk can be 2-4 seconds of a media file, which could be as large as 1 MB. Chunks are delivered sequentially to the client. The server-side CTCP forms linear combinations from the current chunk to be delivered. This limits the delay seen by the application, since the receiver does not need to decode the whole file before it can decode the chunk and submit it to the application layer.

Figure 4:
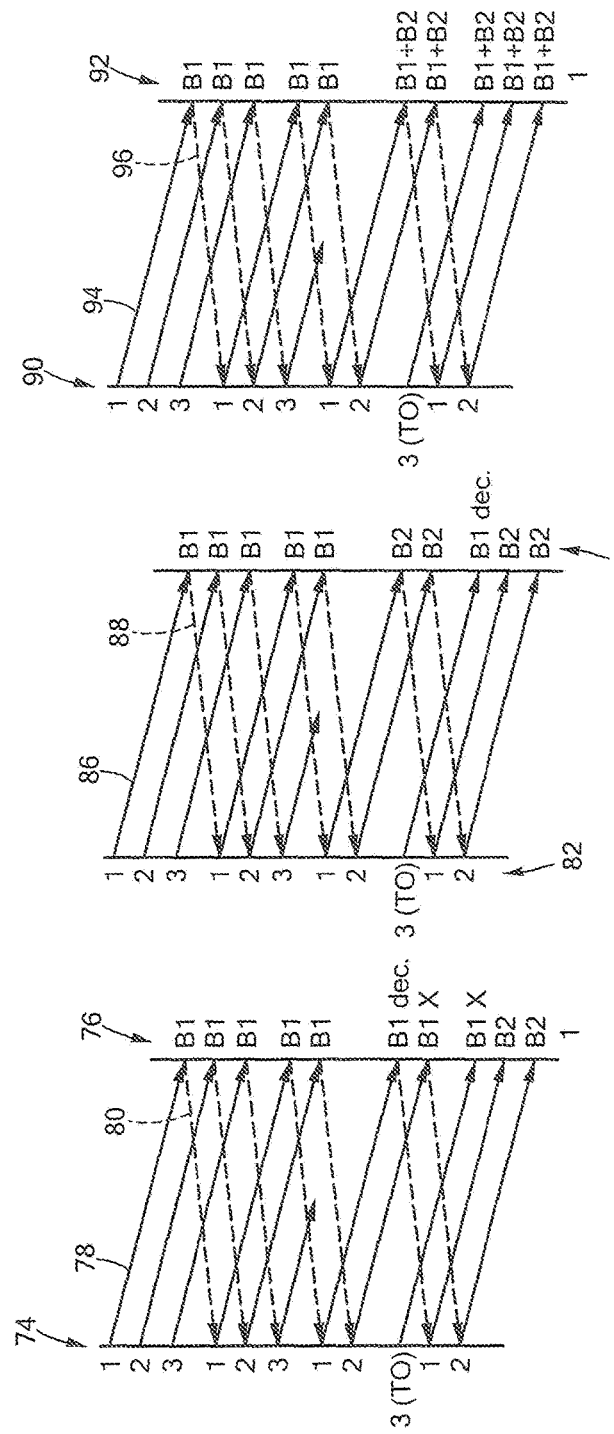
FIG. 4 is an example of a coded packet divided into two blocks (or chunks) B1, B2.
Figure 4:
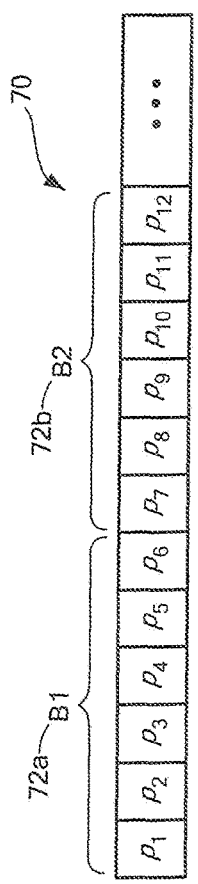

FIG. 4 illustrates a linear combination of coded packets 70 comprised of a plurality of individual coded packets, here twelve packets $p_1$-$p_{12}$ being shown. Coded packets $p_1$-$p_{12}$ are grouped into two blocks B1, B2 (also referred to as chunks 72a, 72b). FIGS. 4A-4C illustrate different transition strategies.

Referring now to FIG. 4A, an example of a transition strategy in which a source 74 begins sending (as indicated by reference numeral 78) coded packets corresponding to a first block B1 to a destination 76 is shown. The source keeps delivering (or otherwise sending or transmitting) the coded packets from the current block B1 until a desired number of degrees of freedom are acknowledged. At this point, source 74 begins sending coded packets from a second block (i.e. block B2) and similarly keeps delivering the coded packets from the second block until a desired number of degrees of freedom are acknowledged. This process is repeated until all blocks have been delivered and acknowledged.

FIG. 4B is an example of a transition strategy in which a source 82 begins sending (as indicated by reference numeral 86) coded packets from a first block (e.g. block B1) to a receiver 84. Once a desired number of transmissions have been (e.g. a number of transmissions suitable for decoding block B1 at the receiver), the source delivers a next block (e.g. block B2). If any packet loss is detected, the source re-transmits a coded packet for the corresponding block.

FIG. 4C is an example of a transition strategy in which a source 90 begins sending coded packets from a first block (e.g. block B1) to a receiver 92. A transition is deferred until the end of a next block at which point the source sends coded packets from both blocks (e.g. both blocks B1+B2 as shown in FIG. 4C);

Referring now to FIGS. 4A-4C, each server-side CTCP sub-flow needs to make a decision regarding when and how it should transition from the current chunk to the next chunk.

FIGS. 4A-4C illustrate several different exemplary transitions. The particular transition strategy to use for any given application depends, at least in part, upon the urgency of the current chunk to the application. This urgency can be signaled through an application programming interface (API) from the application layer, or can be estimated using the communication history.

For instance, consider a scenario in which the sub-flow is nearing the end of a current chunk (or block). As discussed in conjunction with FIG. 4A, the server may choose to send additional degrees of freedom in order to combat losses without waiting for the feedback from the receiver or token expiration. Note that it is desirable to have an estimation of the loss rate within the network in order to avoid generating too many redundant degrees of freedom. For example, if the loss rate is 10%, then one may want to send approximately 10% more coded packets corresponding to the unacknowledged data.

On the other hand, the server may choose to transition to the next chunk thereby avoiding the need to send redundant packets while risking the completion of the current chunk. This is discussed above in conjunction with FIG. 4B.

Furthermore, as described in conjunction with FIG. 4C, the server may decide to defer the transition by sending coded packets across the current and the next chunk. By deferring the transition, one reduces or possibly even eliminates the potential inefficiencies caused by redundant packets. However, this approach also delays the delivery of the current chunk. We may defer the transition only if the current chunk is not urgently needed by the application layer. For example, if there are sufficient amount of decoded data buffered at the media player, then the current chunk delivery can be delayed without hurting the user experience.

It should be appreciated that CTCP as described herein can be implemented such that it can completely replace the Transmission Control Protocol (TCP) at the transport layer without requiring any changes in the upper and/or lower layers. The application layer may access CTCP with the same API commands as it would access a TCP socket. Moreover, the CTCP packets may be structured such that it appears as a TCP packet to the IP layer. This is particularly useful for compatibility with the current implementations of middle boxes (i.e. a device in the Internet that provides transport policy enforcement) and network address translators (NATs).

In addition, if any of the end-points are not capable of supporting CTCP, they can still establish a connection with a CTCP-enabled device as a TCP session. This, in particular, can be achieved during the handshake phase. If at least one of the endpoints does not confirm that it can support CTCP, the whole session can roll-back to a regular TCP session.

Even within a single cellular network/device, there are multiple cellular access technologies, including, but not limited to, 2G, 3G, and 4G. Currently, once a device selects one of these technologies for data transfer, there is no mechanism for this device to switch to other technologies without interrupting the data transfer sessions. This can prevent efficient data transfer, especially when moving across coverage areas utilizing different access technologies. For example, 2G is currently more widespread than 4G, but has a much lower speed. If a connection is started in an area where only 2G is available, when the device moves into an area with both 4G and 2G coverage, the speed of data transfer will not show any improvement. This is a result of the fact that the current network protocols cannot handover the connection from a 2G to a 4G without interrupting the data transfer session. Consequently, if a connection is started in an area where 4G is available, when the device moves out of 4G's coverage, the connection is immediately dropped. The data transfer session has to be re-established over the available access technology in this example 2G access technology. The systems and techniques described herein resolve the above issues by establishing simultaneous connections across the different cellular technologies.

Thus, there are scenarios in which a device may not be able to connect simultaneously to two access points (e.g. as provided by a device that allows wireless devices to connect to networks using Wi-Fi, Bluetooth or related standards sometimes through a router and can relay data between the wireless devices and devices on the networks). This could, for example, be due to hardware constraints such as the device having a single WiFi card thereby limiting the device to be associated to a single WiFi access point at any given time. Such a limitation poses a challenge to a soft-handoff between two access points.

Figure 5:
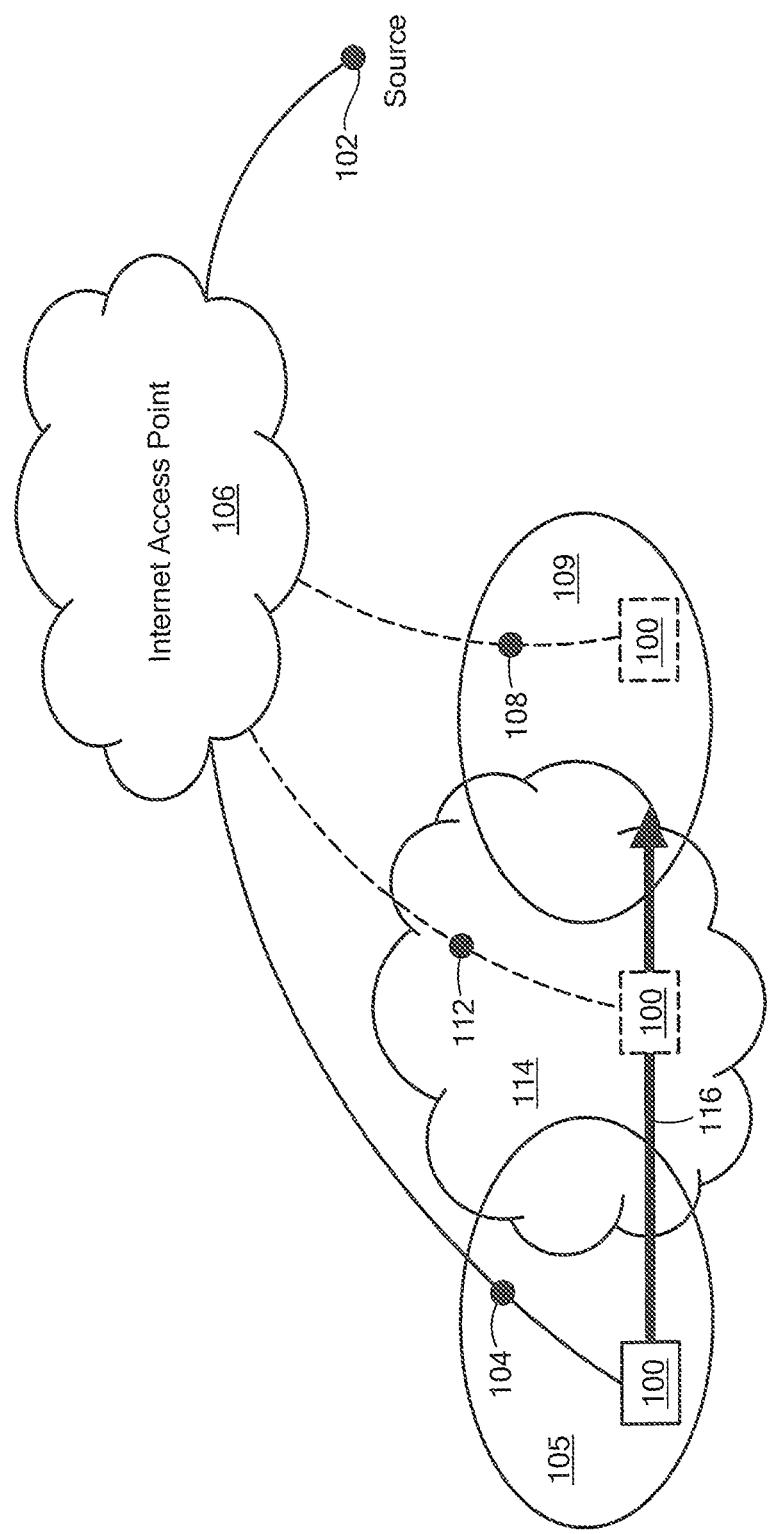
FIG. 5 is a block diagram of an exemplary system illustrating a handoff between two access points using an intermediate access point.

To address such a challenge and with reference now to FIG. 5, the coded communication protocol described herein can be used to implement a method of soft-handoff between two different available access points. In FIG. 5, it is assumed that client-device 100 communicates with a source (e.g. server) 102 through an access point 104. Access point 104 may, in turn, utilize an internet 106 to complete the path between client-device and 100 and source 102. Client-device 100 may be provided, for example, as any type of portable wireless networking device. Client-device 100 may be a hand held device, but is not limited to hand-held devices.

In the exemplary embodiment of FIG. 5 first and second access points 104, 108 are shown as is an intermediate access point 112. Access points 104, 108 provide respective coverage areas 105, 109 and intermediate access point 112 provides a coverage area 114.

In the exemplary embodiment described in conjunction with FIG. 5, access points 104, 108 are each provided as WiFi access points and intermediate access point 112 utilizes 2G, 3G or 4G access technology. It should, of course, be appreciated that in other embodiments access points 104, 108 may be provided via access technologies other than WiFi. For example access points 104, 108 may be provided via Bluetooth or other access technologies. Thus, FIG. 5 illustrates an example where the two access points 104, 108 are using first and second access technologies (here both illustrated as WiFi technologies), and intermediate access point 114 utilizes a different access technology (e.g. 2G, 3G or 4G technology).

Reference numeral 116 indicates a direction in which client-device 100 is moving. Client-device 100 is not able to simultaneously establish two WiFi connections. Thus, as client device moves along path 116 from coverage area 105 to coverage area 114, any data transfer session of client-device 100 will be uninterrupted as client-device 100 moves from the coverage area 105 provided by access point 104 to coverage area 109 provided by access point 108.

Using the concepts, systems and methods described herein, however, client-device 100 can seamlessly transfer the connection from the coverage area 105 provided by access point 104 to a coverage area 114 provided by the 3G access point 112 and then again from coverage area 114 provided by the 3G access point 112 to network coverage area 109 provided by access point 108. That is client-device 100 can seamlessly transfer the connection from WiFi 1 to 3G, then from 3G to WiFi 2. Hence, any data transfer session of client-device 100 will be uninterrupted as device 100 moves from the first WiFi network (i.e. WiFi 1) to the second WiFi network (i.e. WiFi 2). That is, client-device 100 can maintain uninterrupted service (e.g. an uninterrupted data session with server 102) as client device 100 moves from WiFi 1 to WiFi 2.

Such a seamless transfer of a data session between disparate networks can be accomplished utilizing the coding algorithms and control methods described herein. Thus, in a communication system in which a client-device cannot connect to a server simultaneously through first and second access points and wherein each of the first and second access points are using first and second access technologies, a method for transferring an ongoing data session between the first and second access points includes establishing a first connection 119 between the client-device 100 and the server 102 via the first access point 100. As the client-device 100 moves outside the coverage region 105 provided by the first access point 100, the client-device 100 establishes a second connection between the client-device 100 and server 102 via an intermediate access point 114. Intermediate access point 114 establishes a second connection between the client-device 100 and server 102 via an intermediate access point 114. Significantly, at least one of the connections between the first and the intermediate access points must be provided via a coded protocol.

Once the second connection between the client-device 100 and server 102 is established via intermediate access point 114, the first connection through the first access point is terminated.

Next, once the first connection through the first access point is terminated, client-device 100 establishes a third connection between the client-device 100 and the server 102 via the second access point 108. Significantly at least one of the connections between the intermediate and second access points is provided via a coded protocol. Once the third connection between the client-device 100 and server 102 is established via the second access point 108, the second connection through the intermediate access point is terminated.

As discussed above, the first access point, the second access point and the intermediate access point can utilizes one of a plurality of different access technologies including but not limited to 2G, 3G or 4G access technology, WiFi or Bluetooth access technologies or EDGE/GPRS, EvDo, LTE, WiMax, HSPA technologies.

As noted above, the access technology used at the first access point and the access technology used at the intermediate access point are different access technologies. As also noted above, in one embodiment, the coded protocol allows client-device 100 to transfer the connection from WiFi technology used at the first access point to one of 2G, 3G or 4G technology used at the intermediate access point and then back to WiFi technology used at the second access point.

Figure 6:
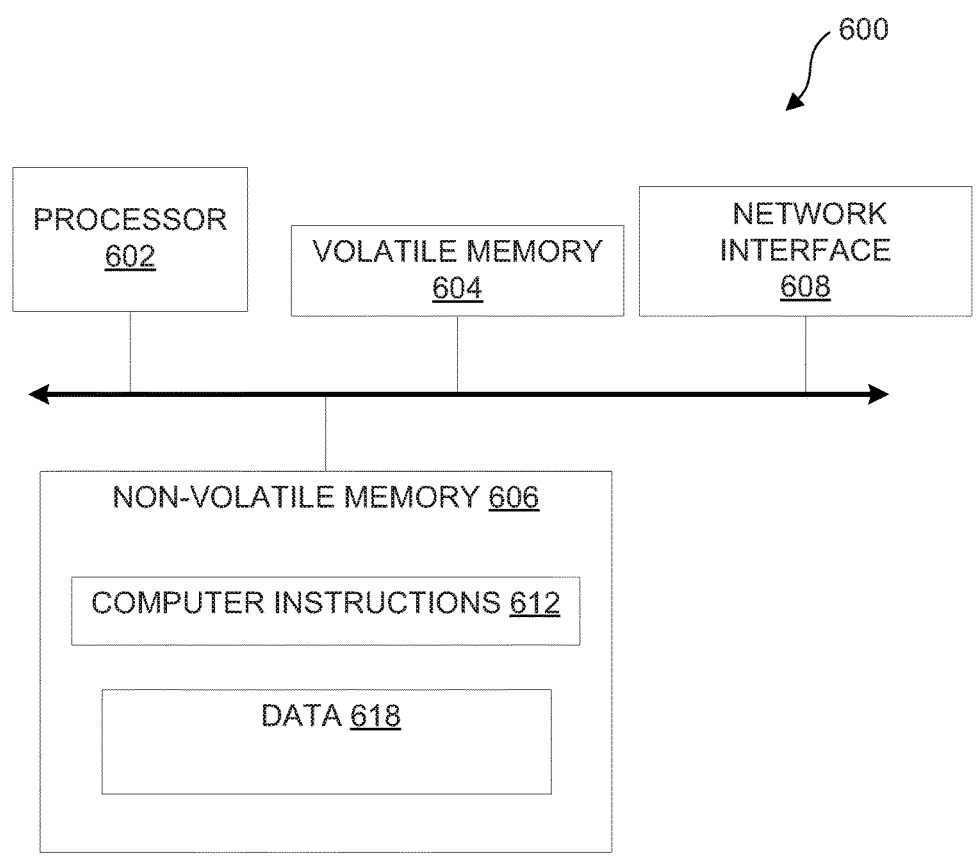
FIG. 6 is a block diagram of a computer.

Referring to FIG. 6, in an embodiment, a computer 600 which may act as a server includes a processor 602, a volatile memory 604 (e.g., RAM), a non-volatile memory 606 (e.g., hard disk) and a network interface 608 (e.g., WiFi, Ethernet, etc. . . . ). The non-volatile memory 606 can store computer instructions 612 and data 618 in a non-transitory fashion. In various embodiments, the computer instructions 612 can be executed by the processor 602 out of volatile memory 604, and data 618 can be transferred between non-volatile memory 606 and volatile memory 604, to perform all or part of the processes described herein (e.g., the processes and communications performed by, for example, the clients (e,g, client 14), servers (e.g., server 12), and nodes referred to herein (e.g., with respect to FIGS. 1-3 and 5).

It should be appreciated that the coding algorithms and control methods described herein above are not limited to implementation in any particular layer of the network protocol stack. For example, the disclosed method may be implemented in the physical layer, link layer, network layer, transport layer and/or application layer. Depending upon which layer in which the coded protocol is implemented, the size of the data units (packets) and the time scale of the coding operations may vary. Nevertheless, features of the method, such as soft vertical-handoff, dynamic load balancing, and ability to maintain multiple connections simultaneously across different interfaces may be maintained regardless of the layer in which the coded protocol technique described herein is implemented.

The foregoing description has been directed to specific embodiments. It will be apparent, however, that variations and modifications may be made to the described embodiments, with the attainment of some or all of their advantages. For instance, it is expressly contemplated that certain components and/or elements described herein can be implemented other than as specifically shown. For example, even though the concepts, systems and techniques described are presented as a transport protocol, after reading the disclosure provided herein, it should be understood after that the same methods may be implemented in the application layer when an unreliable transport protocol e.g. UDP, is in place.

Accordingly, it is submitted that that the concepts and techniques described herein should not be limited to the described embodiments but rather should be limited only by the spirit and scope of the appended claims.

What is claimed is:

1. In a system in which a client-device cannot connect to a server simultaneously through first and second access points, a method for transferring an ongoing data session between the first and second access points, the method comprising:
   establishing a first connection between the client-device and the server via the first access point;
   establishing a second connection between the client-device and server via an intermediate access point; and
   receiving, over both the first and second connections, linear combinations of data packets for the data session using a coded protocol;
   determining if the received linear combinations of data packets are linearly independent from past received packets;
   sending feedback to the server in response to determining the received linear combinations of data packets are linearly independent from past received packets; and
   receiving an additional linear combination of data packets for the data session using the coded protocol in response to the feedback being received at the server.

2. The method of claim 1 further comprising:
   terminating the first connection through the first access point.

3. The method of claim 2 further comprising establishing a third connection between the client-device and the server via the second access point.

4. The method of claim 3 wherein at least one of the connections between the intermediate and the second access points is provided via a coded protocol.

5. The method of claim 1 wherein a first one of the first access point, the second access point and the intermediate access point utilizes WiFi access technology.

6. The method of claim 5 wherein a second one of the first access point, the second access point and the intermediate access point utilizes WiFi access technology.

7. The method of claim 5 wherein a third one of the first access point, the second access point and the intermediate access point utilizes one of 3G or 4G access technology.

8. The method of claim 5 wherein the access technology used at the first access point and the access technology used at the intermediate access point are different access technologies.

9. The method of claim 8 wherein establishing a first connection between the client-device and the server via the first access point and establishing a second connection between the client-device and server via an intermediate access point comprises transferring the connection from WiFi technology used at the first access point to one of 3G or 4G technology used at the intermediate access point.

10. The method of claim 1 wherein the access technology used at the first access point is the same as the access technology used at the second access point.

11. The method of claim 1, wherein the server includes a sender having a plurality of available tokens and receiving linear combinations of data packets for the data session includes receiving a linear combination of data packets for each token available at the server, the method further comprising:
   returning a token to the sender in response to receiving the feedback, wherein receiving the additional linear combination of data packets comprises receiving the additional linear combination of data packets in response to the token being returned to the sender.

12. The method of claim 1, wherein sending feedback to the server includes sending an acknowledgment to the server.

13. In a system in which a client-device cannot connect to a server simultaneously through first and second access points, a method for transferring an ongoing data session between the first and second access points, the method comprising:
   establishing a first connection between the client-device and the server via the first access point to support the ongoing data session;
   establishing a second connection between the client-device and the server via an intermediate access point to support the ongoing data session, the intermediate access point using a different access technology than the first and second access points, wherein at least one of the first and second connections is provided using a coded protocol;
   receiving, over both the first and second connections, linear combinations of data packets for the data session using a coded protocol;
   determining if the received linear combinations of data packets are linearly independent from past received packets;
   sending feedback to the server in response to determining the received linear combinations of data packets are linearly independent from past received packets;
   receiving an additional linear combination of data packets for the data session using the coded protocol in response to the feedback being received at the server;
   terminating the first connection through the first access point; and
   establishing a third connection between the client-device and the server via the second access point to support the ongoing data session; and
   receiving, over both the second and third connections, linear combinations of data packets for the data session using the coded protocol.

14. The method of claim 13 further comprising: terminating the second connection through the intermediate access point.

15. The method of claim 13 wherein the coded protocol uses network coding.

16. The method of claim 13 wherein at least one of the second and third connections is provided using the coded protocol.

17. The method of claim 13 wherein the access technologies used at the first and second access points are different access technologies.

18. The method of claim 13 wherein establishing a first connection between the client-device and the server via the first access point and establishing a second connection between the client-device and server via an intermediate access point comprises transferring the connection from WiFi technology used at the first access point to one of 3G or 4G technology used at the intermediate access point.

19. The method of claim 13 wherein the access technology used at the first access point is the same as the access technology used at the second access point.

20. The method of claim 13 wherein a first one of the first access point, the second access point, and the intermediate access point utilizes WiFi access technology.

21. The method of claim 20 wherein a second one of the first access point, the second access point and the intermediate access point utilizes WiFi access technology.

22. The method of claim 20 wherein at least one of the first access point, the second access point, and the intermediate access point utilizes one of 3G or 4G access technology.

23. A server comprising:
a processor;
a volatile memory; and
a non-volatile memory storing computer program code that when executed on the processor causes the processor to execute a process operable to:
 establish a first connection between a client-device and the server via a first access point;
 establish a second connection between the client-device and the server via an intermediate access point; and
 transmit, over both the first and second connections, linear combinations of data packets for the data session using a coded protocol;
 receive feedback from the client-device in response to the client-device determining the received linear combinations of data packets are linearly independent from past received packets; and
 transmit an additional linear combination of data packets for the data session using the coded protocol in response to the feedback being received at the server.

24. The server of claim 23 further comprising:
a sender having a plurality of available tokens,
wherein the computer program code that when executed on the processor causes the processor to execute a process further operable to:
 return a token to the sender in response to receiving the feedback, wherein transmitting the additional linear combination of data packets comprises transmitting the additional linear combination of data packets in response to the token being returned to the sender.

25. A client-device comprising:
a processor;
a volatile memory; and
a non-volatile memory storing computer program code that when executed on the processor causes the processor to execute a process operable to:
 establish a first connection between the client-device and a server via a first access point;
 establish a second connection between the client-device and the server via an intermediate access point; and
 receive, over both the first and second connections, linear combinations of data packets for the data session using a coded protocol;
 determine if the received linear combinations of data packets are linearly independent from past received packets;
 transmit feedback to the server in response to the determining the received linear combinations of data packets are linearly independent from past received packets; and
 receive an additional linear combination of data packets for the data session using the coded protocol in response to the feedback being received at the server.

* * * * *

UNITED STATES PATENT AND TRADEMARK OFFICE
CERTIFICATE OF CORRECTION

PATENT NO. : 9,877,265 B2
APPLICATION NO. : 14/297090
DATED : January 23, 2018
INVENTOR(S) : Minji Kim et al.

Page 1 of 2

It is certified that error appears in the above-identified patent and that said Letters Patent is hereby corrected as shown below:

In the Specification

Column 3, Line 60, delete "which where a" and replace with --which a--

Column 4, Line 56, delete "of the some" and replace with --of some--

Column 6, Line 6, delete "link" and replace with --the link--

Column 7, Line 45, delete "system, It" and replace with --systems. It--

Column 7, Line 60, delete "16a-16n portions" and replace with --16a-16n, portions--

Column 8, Line 41, delete "path 38b If" and replace with --path 38b. If--

Column 9, Line 9, delete "of sliding/" and replace with --of a sliding/--

Column 11, Line 26, delete "been (e.g..." and replace with --been received (e.g.--

Column 11, Line 35, delete "FIG. 4C);" and replace with --FIG. 4C).--

Column 12, Line 2, delete "amount" and replace with --amounts--

Column 12, Line 66, delete "client-device and 100" and replace with --client-device 100--

Column 13, Line 5, delete "as in an" and replace with --as an--

Column 14, Line 16, delete "utilizes" and replace with --utilize--

Column 14, Line 16, delete "herein above" and replace with --above--

Signed and Sealed this
Fourth Day of June, 2019

Andrei Iancu
*Director of the United States Patent and Trademark Office*

CERTIFICATE OF CORRECTION (continued)
U.S. Pat. No. 9,877,265 B2

Column 15, Line 1, delete "after that" and replace with --that--

Column 15, Line 3, delete "e.g. UDP, is" and replace with --(e.g. UDP) is--

Column 15, Line 4, delete "that that" and replace with --that the--